US010138075B2

(12) United States Patent
Maguire

(10) Patent No.: US 10,138,075 B2
(45) Date of Patent: Nov. 27, 2018

(54) TOWER CONFIGURATION GRAVIMETRIC BLENDER

(71) Applicant: Stephen B. Maguire, West Chester, PA (US)

(72) Inventor: Stephen B. Maguire, West Chester, PA (US)

( * ) Notice: Subject to any disclaimer, the term of this patent is extended or adjusted under 35 U.S.C. 154(b) by 0 days.

(21) Appl. No.: 15/293,409

(22) Filed: Oct. 14, 2016

(65) Prior Publication Data

US 2018/0099253 A1 Apr. 12, 2018

Related U.S. Application Data

(63) Continuation-in-part of application No. 29/580,163, filed on Oct. 6, 2016.

(51) Int. Cl.

| | |
|---|---|
| ***B65G 53/24*** | (2006.01) |
| ***B29B 7/60*** | (2006.01) |
| ***G01G 13/00*** | (2006.01) |
| *B29B 7/24* | (2006.01) |
| *B65G 53/36* | (2006.01) |

(52) U.S. Cl.

CPC .............. *B65G 53/24* (2013.01); *B29B 7/603* (2013.01); *G01G 13/00* (2013.01); *B29B 7/244* (2013.01); *B65G 53/36* (2013.01)

(58) Field of Classification Search

CPC ........ B65G 53/24; B65G 53/26; B65G 53/58; B65G 53/60

USPC .................. 406/23, 83, 151, 152, 153, 168; 366/163.1, 163.2

See application file for complete search history.

(56) References Cited

U.S. PATENT DOCUMENTS

| | | | | |
|---|---|---|---|---|
| 540,154 | A | 5/1895 | Dreisoerner | |
| 600,233 | A | 5/1898 | Palm | |
| 753,597 | A | 3/1904 | Long | |
| 937,096 | A | 10/1909 | Schmid | |
| 1,451,759 | A | 4/1923 | Bruhn | |
| 1,489,348 | A | 4/1924 | Hampton | |
| 1,520,017 | A | 12/1924 | Denton | |
| 2,161,190 | A | 6/1939 | Paull | |
| 2,188,646 | A | 1/1940 | Bunch | |
| 2,199,657 | A | 5/1940 | Bunch | |
| 2,434,345 | A * | 1/1948 | Saylor | B65G 53/24 406/168 |

(Continued)

FOREIGN PATENT DOCUMENTS

| | | |
|---|---|---|
| CA | 1100402 | 5/1981 |
| DE | 1255582 | 11/1967 |

(Continued)

OTHER PUBLICATIONS

Maguire Products, Inc., "Weigh Scale Blender Technical Information—Specifications, Features" Nov. 4, 1994.

(Continued)

*Primary Examiner* — Joseph A Dillon, Jr.

(74) *Attorney, Agent, or Firm* — Fox Rothschild LLP

(57) ABSTRACT

A gravimetric blender includes a vertical conduit, a vacuum pump having a suction inlet communicating with the interior of the conduit, a plurality of receivers connected to the conduit and vertically supported thereby with each receiver having a single tube therewithin extending from the resin material/vacuum drawn stream inlet to the connection of the receiver with the conduit.

10 Claims, 11 Drawing Sheets

(56) References Cited

U.S. PATENT DOCUMENTS 2,550,240 A 4/1951 Geiger et al.
2,587,338 A 2/1952 Lee et al.
2,606,696 A 8/1952 Miner
2,656,828 A 10/1953 Conover
2,665,825 A 1/1954 Poitras et al.
2,701,881 A 2/1955 McGee
2,893,602 A 7/1959 Barber et al.
2,909,315 A 10/1959 Sampietro
3,111,115 A 11/1963 Best
3,115,276 A 12/1963 Johanningmeier
3,138,117 A 6/1964 Dorey
3,209,898 A 10/1965 Beebe et al.
3,228,563 A 1/1966 Rankin et al.
3,252,531 A 5/1966 Mayer et al.
3,258,296 A * 6/1966 Von Funk .............. B65G 53/24 406/11
3,348,848 A 10/1967 Lucking et al.
3,410,530 A 11/1968 Gilman
3,470,994 A 10/1969 Schnell et al.
3,476,358 A 11/1969 Westerlund et al.
3,518,033 A 6/1970 Anderson
3,702,140 A 11/1972 O'Connor
3,733,012 A 5/1973 Grun
3,735,641 A 5/1973 Bink et al.
3,799,622 A * 3/1974 Hek ...................... B65G 53/24 406/109
3,814,388 A 6/1974 Jakob
3,822,866 A 7/1974 Daester et al.
3,853,190 A 12/1974 Delesdernier
3,871,629 A 3/1975 Hishida
3,957,399 A 5/1976 Siczek
3,959,636 A 5/1976 Johnson et al.
3,967,815 A 7/1976 Backus et al.
3,985,262 A 10/1976 Nauta
3,985,345 A 10/1976 Jakob
3,988,088 A 10/1976 King et al.
3,989,229 A 11/1976 Nogushi et al.
3,989,308 A * 11/1976 Zimmermann ........ B65G 53/24 222/504
3,998,103 A 12/1976 Bjorklund et al.
4,014,462 A 3/1977 Robertson
4,026,442 A 5/1977 Orton
4,037,827 A 7/1977 Davison
4,087,134 A * 5/1978 Jordan .................. B65G 53/26 406/146
4,095,776 A * 6/1978 Baumann .............. B65G 53/24 366/106
4,103,357 A 7/1978 Nogushi et al.
4,108,334 A 8/1978 Moller
4,148,100 A 4/1979 Moller
4,185,948 A 1/1980 Maguire
4,219,136 A 8/1980 Williams et al.
D258,213 S 2/1981 Lydford
4,339,277 A 7/1982 Schult
4,341,492 A * 7/1982 Montgomery, Jr. ... B65G 53/24 119/442
4,354,622 A 10/1982 Wood
4,364,666 A 12/1982 Keyes
4,379,663 A * 4/1983 Allison .................. B65G 53/60 222/134
4,391,140 A 7/1983 Reinhard et al.
4,394,941 A 7/1983 Recine
4,402,436 A 9/1983 Hellgren
4,415,297 A * 11/1983 Boring .................. B65G 53/24 406/168
4,454,943 A 6/1984 Moller
4,459,028 A 7/1984 Bruder et al.
4,473,173 A 9/1984 DeGroff et al.
4,475,672 A 10/1984 Whitehead
4,486,100 A * 12/1984 Endo ....................... B29C 47/92 222/71
4,498,783 A 2/1985 Rudolph
4,499,962 A 2/1985 Izumi
4,501,405 A 2/1985 Usry
4,505,407 A 3/1985 Johnson
4,522,321 A 6/1985 Kinoshita
4,525,071 A 6/1985 Horowitz et al.
4,544,279 A 10/1985 Rudolph
4,552,235 A 11/1985 Brunnschweiler
4,571,416 A 2/1986 Jarzombek et al.
4,581,704 A 4/1986 Mitsukawa
4,586,882 A 5/1986 Tseng
4,606,710 A 8/1986 Maguire
4,619,379 A 10/1986 Biehl
4,621,990 A 11/1986 Forsythe et al.
4,629,410 A 12/1986 Hehl
4,657,490 A 4/1987 Abbott
4,705,083 A 11/1987 Rossetti
D294,363 S 2/1988 Donhauser
4,733,971 A 3/1988 Pratt
4,756,348 A 7/1988 Moller
4,793,711 A 12/1988 Ohlson
4,812,048 A 3/1989 Neumann et al.
4,830,508 A 5/1989 Higuchi et al.
4,848,534 A 7/1989 Sandwall
4,850,703 A 7/1989 Hanaoka et al.
D303,672 S 9/1989 Stienen
4,895,450 A 1/1990 Holik
4,957,176 A 9/1990 Roth
4,967,940 A 11/1990 Blette et al.
5,039,279 A 8/1991 Natwick et al.
5,074,519 A 12/1991 Pettus
5,090,450 A 2/1992 Pelech et al.
5,096,302 A 3/1992 Durina
5,110,521 A 5/1992 Moller
5,116,547 A 5/1992 Tsukahara et al.
5,116,548 A 5/1992 Tsukahara et al.
5,125,535 A 6/1992 Ohlman
5,132,897 A 7/1992 Allenberg
5,143,166 A 9/1992 Hough
5,148,943 A 9/1992 Moller
5,161,714 A 11/1992 Neumann et al.
5,172,489 A 12/1992 Moller
5,199,852 A 4/1993 Danby
5,213,724 A 5/1993 Saatkamp
5,215,215 A 6/1993 Sauer
5,217,108 A 6/1993 Newnan
5,219,224 A 6/1993 Pratt
5,225,210 A 7/1993 Shimoda
5,240,324 A 8/1993 Phillips et al.
5,243,455 A 9/1993 Ricciardi et al.
5,252,008 A 10/1993 May, III et al.
5,261,743 A 11/1993 Moller
5,282,548 A 2/1994 Ishihara
5,285,930 A 2/1994 Nielsen
5,340,949 A 8/1994 Fujimura et al.
5,341,961 A 8/1994 Hausam
5,344,232 A 9/1994 Nelson et al.
5,364,242 A 11/1994 Olsen
5,379,923 A 1/1995 Sagastegui et al.
5,423,455 A 6/1995 Ricciardi et al.
5,450,984 A 9/1995 Rohr
5,527,107 A 6/1996 Weibel et al.
5,575,596 A * 11/1996 Bauer .................... B65G 53/24 406/132
5,599,099 A 2/1997 Bullivant
5,599,101 A 2/1997 Pardikes
5,651,401 A 7/1997 Cados
5,767,453 A 6/1998 Wakou et al.
5,767,455 A 6/1998 Mosher
5,772,319 A 6/1998 Pemberton et al.
5,780,779 A 7/1998 Kitamura et al.
5,843,513 A 12/1998 Wilke et al.
5,853,244 A 12/1998 Hoff et al.
5,896,297 A 4/1999 Valerino, Sr.
5,980,490 A 11/1999 Tsoukalis
5,988,983 A 11/1999 Furusawa
6,007,236 A 12/1999 Maguire
D424,587 S 5/2000 Maguire
6,057,514 A 5/2000 Maguire
6,089,745 A 7/2000 Feistkorn et al.
6,089,794 A 7/2000 Maguire
6,102,562 A 8/2000 Bengtson

(56) References Cited

U.S. PATENT DOCUMENTS 6,111,206 A 8/2000 Maguire
6,131,174 A 10/2000 Fischer et al.
6,154,980 A 12/2000 Maguire
6,155,709 A 12/2000 O'Callaghan
6,188,936 B1 2/2001 Maguire et al.
6,203,184 B1 3/2001 O'Callaghan
6,213,739 B1 4/2001 Phallen et al.
6,338,466 B1 1/2002 Wallace et al.
6,340,487 B1 1/2002 Wenger et al.
6,379,086 B1* 4/2002 Goth ....................... B29C 47/10 406/130
6,386,841 B1 5/2002 Probst
6,402,363 B1 6/2002 Maguire
6,405,949 B1 6/2002 Maguire
6,447,215 B1* 9/2002 Wellmar ................ B65G 53/66 406/11
6,467,943 B1 10/2002 Maguire
6,599,005 B2 7/2003 Van Der Wel
6,719,453 B2 4/2004 Cosman et al.
6,774,318 B2 8/2004 Beal et al.
6,880,965 B1 4/2005 Sheffield, Jr.
6,890,129 B2* 5/2005 Fabbri .................... B01D 29/01 406/106
7,066,689 B2* 6/2006 Maguire ................ B65G 53/66 406/163
7,137,729 B2 11/2006 Moretto
7,154,069 B1 12/2006 Gordon
7,228,990 B2* 6/2007 Schmidt .................... B28C 5/40 141/83
7,234,247 B2 6/2007 Maguire
7,347,007 B2 3/2008 Maguire
7,390,119 B2 6/2008 Maguire
D575,314 S 8/2008 Hind
7,416,096 B2 8/2008 Maguire
D612,878 S 3/2010 Meter
7,810,986 B2 10/2010 Landers et al.
D633,119 S 2/2011 Mackel
7,896,584 B2* 3/2011 Sundholm .............. B01D 47/06 406/153
7,958,915 B2 6/2011 Maguire
7,980,834 B2 7/2011 Maguire
8,092,070 B2 1/2012 Maguire
8,113,745 B2* 2/2012 Aoki .................... B65G 53/525 406/126
8,220,984 B2 7/2012 Deters et al.
8,360,691 B2* 1/2013 Moretto ................. B65G 53/66 406/122
8,491,228 B2* 7/2013 Snowdon ............... B01J 8/0025 406/14
8,967,919 B2* 3/2015 Yaluris ................... B01J 8/0015 177/1
9,010,988 B2 4/2015 Maguire
2001/0024400 A1 9/2001 Van Der Wel
2002/0031822 A1 3/2002 van der Wel et al.
2002/0136609 A1 9/2002 Maguire
2003/0021181 A1 1/2003 Maguire
2003/0024955 A1 2/2003 Maguire
2003/0035692 A1* 2/2003 Dietrich ................ B05B 7/1459 406/173
2003/0075626 A1 4/2003 Maguire
2003/0142580 A1 7/2003 Maguire
2003/0185095 A1 10/2003 Moretto
2003/0218014 A1 11/2003 Gregory et al.
2005/0039816 A1 2/2005 Maguire
2005/0052945 A1 3/2005 Maguire
2006/0080858 A1 4/2006 Maguire
2006/0185186 A1 8/2006 Maguire
2007/0289659 A1 12/2007 Maguire
2007/0291578 A1 12/2007 Maguire
2007/0292288 A1 12/2007 Maguire
2007/0292290 A1 12/2007 Maguire
2007/0297278 A1 12/2007 Maguire
2008/0145155 A1* 6/2008 Volkmann .............. B65G 53/00 406/12
2008/0267004 A1 10/2008 Deters et al.
2009/0126564 A1 5/2009 Maguire
2009/0257832 A1 10/2009 Maguire
2010/0170659 A1 7/2010 Maguire
2010/0310326 A1* 12/2010 Sundholm ............... B65F 5/005 406/85
2012/0195154 A1 8/2012 Maguire
2012/0301230 A1 11/2012 Marchesini et al.
2013/0135958 A1 5/2013 O'Callaghan
2015/0197037 A1 7/2015 Maguire
2015/0239150 A1 8/2015 Maguire
2015/0290607 A1 10/2015 Tolle
2015/0321860 A1* 11/2015 Maguire ................ B65G 53/66 406/3
2016/0214793 A1 7/2016 Maguire et al.
2016/0251173 A1* 9/2016 Sundholm ............... B65F 5/005 406/83
2016/0280473 A1* 9/2016 Veselov ................. B65G 53/24
2016/0346745 A1 12/2016 Mothersbaugh
2017/0297830 A1 10/2017 Donohoo
2018/0099253 A1 4/2018 Maguire

FOREIGN PATENT DOCUMENTS

DE 1982969 4/1968
DE 2 034 837 4/1972
DE 32 37 353 4/1984
DE 34 08 820 9/1985
DE 3433693 A1 3/1986
DE 35 41 532 5/1986
DE 39 23 241 1/1991
DE 43 23 295 2/1995
DE 196 14 688 A1 10/1997
EP 171291 A2 3/1960
EP 0 318 170 5/1989
EP 0 507 689 10/1992
EP 0 587 085 3/1994
EP 0 678 736 10/1995
EP 0 743 149 11/1996
FR 1167265 11/1958
FR 1 477 595 A 4/1967
FR 2517087 5/1983
GB 1004877 9/1965
GB 1120270 7/1968
GB 1145752 3/1969
GB 1303459 1/1973
GB 2081687 2/1982
GB 2161090 1/1986
JP 59082936 5/1984
JP 2253835 10/1990
JP 4176608 6/1992
JP 04201522 7/1992
SU 1310290 5/1987
WO WO 87/07182 12/1987
WO WO 91/11689 8/1991
WO WO 01/49374 A1 7/2001
WO WO 12/074539 A1 6/2012

OTHER PUBLICATIONS

Sheet of 2 photographs of Mould-Tek gravimetric blender, circa 1993.
Sheet of 2 photographs of Motan gravimetric blender and feeding system with Maguire Products, Inc. controls, circa 1993.
Sheet of 3 photographs of UNA-DYN gravimetric blender, circa 1993.
Sheet of 2 photographs of Maguire Products, Inc. gravimetric blender with Conair hoppers and feeding system, circa 1993.
Sheet of 1 photograph of Hydracolor gravimetric blender, circa 1993.
Four page brochure entitled "Gravimix Better Quality through Research", circa 1993.
Two-sided flyer entitled "GB 140 Series Compact Auto Weigh Blender" published by Conair Franklin in the United States, Jun. 1994.
Six page brochure entitled "Graviblend Precise Continuous Weigh Blenders" published by Ktron Vertech, Jun. 1991, United States.

(56) References Cited

OTHER PUBLICATIONS

Six page brochure entitled "Piovan Gravimetric Blenders MDW" published by Piovan Sri, Oct. 1993, Venezia, Italy.
One page two-sided flyer entitled "Gravimix, The New Gravimetric Blending Generation" published by Ferlin, De demsvaard, Holland, circa 1993.
Four page brochure entitled "When you Weigh it All Up . . . " published by Ferlin Trading, Holland, circa 1993.
Two page brochure entitled "Mould-Tek Bulk Handling Systems" published by Mould-Tek Industries, Inc. in Canada, circa 1993.
Five page brochure entitled "Blending power: GXB Blender the Better Alternative" of Mould-Tek, circa 1998.
One page brochure "Una-Dyn Additive Feeder".
Two pages of advertisements from European Plastics News, pp. 76 and 75, Sep. 2000.
Four page brochure entitled "Novatec Gravimetric Blenders".
Two-sided color brochure entitled Maguire: WSB-MB Micro-Blender of Maguire Products, Inc., Jun. 1997.
Three page, two-sided color brochure entitled Maguire: Blender Selection Guide, Jun. 1997.
Two-sided color brochure entitled "Convey, Blend, Dry" published by Novatec, Inc., undated.
Three page two-sided color brochure entitled "Accuracy, flexibility and performance are at your fingertips with ConveyPacer III Series "S" Controller" of Mould-tek, 1999.
Seven page two-sided color brochure plus cover entitled "Exac-U-Batch Series Weigh Scale Blenders: Engineered to be the ultimate blend of precision and control!" of Mould-tek, 2000.
Three page two-sided color brochure entitled "We have the building blocks to integrate your entire plastics bulk handling system." of Mould-tek, 1999.
One page two-sided color brochure entitled "Saturn's comparative testing program selected Mould-Tek's GXB Blender" of Mould-tek, undated.
Advertisement entitled "Machinery and Systems for Extrusion is Our Only Business" by Process Control Corporation, circa 1993.
Advertisement "Introducing our 400 VME-II Gravimetric Blender" by HydReclaim Corporation, circa 1993.
Four page brochure entitled "Conomix Plus Volumetric Blender" dated Aug. 1993.
Four page brochure entitled "Conair Franklin Autocolor Y Mezclador" dated Mar. 1995.
Thirty-two page catalog entitled "Maguire Color Blending Equipment" published by Maguire Products, Inc., 1993, United States.
Brochure entitled "Plastic Molders and Extruders: published by Maguire Products, Inc., 1995".
Forty-four page two-sided brochure including cover and back pages entitled "Maguire: Auxiliary equipment for the plastics industry" of Maguire Products, Inc., Oct. 2000.
Five page two-sided color brochure entitled "Gravicolor 100: Gravimetric mixing and dosing unit" of Motan, date unknown.
Two page two-sided color brochure entitled "Model GXB-2202 Exac-U-Batch Gravimetric Scale Blender: Accurate weigh scale blending under precise computer control" of Mould-tek, 2000.
One page two-sided color brochure entitled "NovaBlend Model 600" of Novatec Inc., Jun. 1997.
International Search Report dated Aug. 7, 1998 of PCT/US98/10102.
International Search Report dated Apr. 29, 1998 of PCT/US97/23172.
Supplementary European Search Report dated Jan. 14, 2002 of EP 97954838.
Two page two-sided color brochure entitled "Optimum Series™: OL Blenders and Weigh Hoppers" of AEC HydReclaim, 2000.
Four page two-sided color brochure entitled "Optimum Series™: Gravimetric Batch Blenders" of AEC HydReclaim, 2000.
One page two-sided color brochure entitled "Guardian Batch Blender" of Process Control Corporation, date unknown.
Forty-two page brochure, plus cover of Maguire Products, Inc., "Weigh Scale Blender Technical Information—Specifications, Features", Jun. 14, 1998.
Ninety-three page brochure, plus cover of Maguire Products, Inc. Weigh Scale Blender with 'Four' Component Software—Operation and Maintenance Manual, Jun. 12, 2001.
Four page brochure entitled Plastics Product Review, Dec./Jan. 1997-98.
One page advertisement entitled "Former Processor Steve Maguire on the Micro-Blender™ System", Plastics Auxiliaries, Sep. 1999.
Two page brochure entitled "Just one good idea after another", Maguire Products, Inc., undated.
One page advertisement entitled New Product Showcase: Miniature receivers allow central conveying to micro-blenders, Injection Molding, p. 230, Oct. 1998.
Two page mailing entitled "Maguire . . . More sizes . . . more options . . . more choices" of Maguire Products, Inc., undated.
Three pages entitled "Maguire blender targets small presses", Modern Plastics Show Daily, pp. 1 and 61, Jun. 18, 1997.
One page entitled "Maguire shows Micro-Blender, software", Plastics News, p. 8, Jun. 18, 1997.
One page entitled "Maguire blender targets small injection presses", Modern Plastics, p. 79, Jul. 1997.
Three page release of Maguire Products, Inc. entitled "Jun. 1997: World's Smallest Gravimetric Blender, Unveiled at NPE. Brings New Capabilities to a Wide Range of Processing Equipment".
Two page release of Maguire Products, Inc. entitled "Jun. 1998: MicroBlender receives "Best Buy" status".
One page release entitled "Jun. 2000—Maguire Alleges Patent Infringement by Novatec, Labotek, Piovan and Ferlin".
Three pages entitled "Feeders, blenders offer more exacting levels of performance", Focus, Jun. 1998, pp. 115-117.
One page advertisement "Marketplace", Canadian Plastics, Jul. 1998, p. 40.
One page advertisement of Plastics Auxiliaries, Sep. 1998, p. 63.
One page entitled "Smallest Blender Adds 'Clear-Vu' Loading", Plastics Engineering, Sep. 1998, p. 49.
Two pages entitled "Maguire's Miniature Receivers Tie Micro-Blenders to a Central Loading System", Plastics Focus, Oct. 19, 1998, p. 5-6.
Six page article entitled "It's All in the Mix", Molding Systems, Mar. 1999, pp. 24-29.
One page entitled Maguire Products—Product Data Sheet—Weigh Scale Blender—Micro Blender, Aug. 1998.
One page color advertisement entitled "Great thinkers choose the world's smartest blender", Injection Molding, Feb. 2000, p. 116.
Two page color advertisement entitled "Maguire customers respect the power of these simple words: The perfect blend of simplicity and control.", Plastics News, Mar. 8, 1999, inside cover.
Five page press release of Maguire Products, Inc. entitled "World's Smallest Gravimetric Blender, Unveiled at NPE, Brings New Capability to Wide Range of Processing Equipment", Jun. 17, 1997.
Five page press release of Maguire Products, Inc., entitled "Extrusion Control System Developed by Maguire Boosts Quality and Productivity, Costs 50% Less than Existing Equipment", Jun. 17, 1997.
One page, two-sided color brochure entitled "Bulk handling power: the manufacturer of the world's most advanced blender gives you the same performance in bulk handling systems" of Mould-Tek, dated Apr. 1999.
One page advertisement entitled "Micrabatch Gravimetric Blender" of TSM Control Systems, dated Oct. 2001.
Two page product information sheet entitled "Gravimetric Batch Blending:" of TSM Control Systems, date unknown.
Two page color brochure entitled "New Gravimetric Dosers" of Moretto P.A. s.r.l., dated 2001.
One page advertisement entitled "Ancillaries: Hoppers, Loaders & Blenders", date unknown.
Four page brochure entitled "BlendingLine: Gravicolor: Gravimetric mixing and dosing units" of Motan, Oct. 2000.
One page advertisement entitled "AEC Engineering What's Next: A Whole New Meaning to Less Is More" of AEC HydReclaim, Jun. 2000.

(56) References Cited

OTHER PUBLICATIONS

Three pages of Comet E-newsletter of Comet Automation Systems, Inc., distributed Fall 2002.
One page from Plastics News, Oct. 21, 2002, p. 4.
Two pages from Plastics Equipment Trends, Nov. 2002, pp. 6-7.
One page from Plastics Technology Magazine, May 2003, p. 49.
One page from Injection Molding Magazine, May 2003, p. 123.
One page from Plastics in Packaging, May 2003, p. 26.
One page from Plastics Machinery & Auxiliaries, Sep. 2003, p. 27.
Two pages brochure of Comet Automatic Systems Inc. entitled "GraviMix Micro Blending System", 2002.
27 page manual entitled "Gravimix: Gravimix Micro Blending System" of Comet Automation Systems, Inc., circa 2002.
Two page brochure of GBX Blender, The Better Alternative, Mould-Tek, Nov. 1999.
Advertisement entitled "Weigh Blender Delivers Unmatched Accuracy" by Universal Dynamics, Inc., circa 1993.
Advertisement entitled "A Full Line-up of Blender Solutions . . . Priced Right" by HydReclaim, circa 1993.
Advertisement entitled "New From HydReclaim—Now Processors Can Economically Achieve Continuous Gravimetric Blending" by HydReclaim, circa 1993.
Article entitled "Control Loading Systems" from Plastics Technology, Oct. 1995, p. 41.
Two-sided color brochure entitled Maguire: Model MPA Liquid Color Pump , Maguire Products, Inc., published Dec. 28, 1995.
International Search Report for PCT/US02/02934, dated Feb. 20, 2003.
Written Opinion for PCT/US02/02934, dated Mar. 24, 2003.
International Search Report for PCT/US2017/056317, dated Jan. 3, 2018.
Written Opinion for PCT/US2017/056317, dated Jan. 3, 2018.

* cited by examiner

TOWER CONFIGURATION GRAVIMETRIC BLENDER

CROSS REFERENCE TO RELATED PATENT APPLICATION

This patent application is a continuation-in-part of co-pending U.S. design patent application Ser. No. 29/580,163 filed 6 Oct. 2016 in the name of Steven B. Maguire.

STATEMENT REGARDING FEDERALLY SPONSORED RESEARCH OR DEVELOPMENT

Not applicable

INCORPORATION BY REFERENCE

The disclosures of U.S. Pat. Nos. 8,070,855 and 9,387,996 are hereby incorporated by reference in their entirety.

FIELD OF THE INVENTION/NOMENCLATURE

The terms "air/vacuum," "vacuum/air" and "air/vacuum stream," and the like are used synonymously and interchangeably herein to denote a moving stream of air, at sub-atmospheric pressure, drawn by a vacuum pump. Such moving "air/vacuum" streams are conventionally used to convey granular plastic resin material in facilities in which the granular plastic resin is molded or extruded into finished or semi-finished plastic parts.

Similarly, the term "resin/vacuum stream" and variations thereof such as "granular resin material/vacuum stream" are used to denote such a high speed stream of air or "vacuum" carrying granules of resin material. Sometimes herein the resin is said to be "entrained" in the moving air/vacuum stream.

As used herein, the term "process machine" denotes collectively compression molding machines, injection molding machines and extruders.

BACKGROUND OF THE INVENTION—DESCRIPTION OF THE PRIOR ART

"Receiver" is a term widely used in the plastics industry to denote devices that temporarily hold granular plastic resin material before the granular plastic resin material is loaded into a hopper for subsequent processing by a compression or injection molding press or an extruder.

Receivers typically include a vacuum chamber that effectively pulls granular plastic resin material into the receiver due to vacuum existing within the vacuum chamber. A vacuum pump is directly or indirectly connected to the receiver to create the vacuum required to pull granular plastic resin material into the receiver. This facilitates moving the granular plastic resin material from a typically remote location to the receiver, which typically feeds a hopper. The receiver, and the vacuum pump are typically part of a larger resin conveying system that conveys the granular plastic resin from a supply to the receiver.

Receivers may be located over surge bins or over other temporary storage units in addition to hoppers.

Receivers typically load in cycles. Specifically, the receiver loads with granular plastic resin material and then discharges the granular plastic resin material in one operating cycle. Accordingly, a receiver requires a collection bin or surge hopper below the receiver to collect the falling granular plastic resin material to be fed to the process machine.

Typically, the vacuum source is remote, namely it is not integrated into the receiver itself. The receiver, in its most simple, elementary form, is a simple chamber that has a vacuum line connected to it to pull air from the chamber to create vacuum inside the chamber. The vacuum then draws granular plastic resin material into the chamber portion of the receiver. The receiver accordingly has a material line connected to it for granular plastic resin material to be pulled by the vacuum into the strong chamber portion of the receiver. Since the receiver has a storage portion with a relatively large volume and a large cross-sectional area relative to the conduit through which the air/vacuum and granular resin material mixture travels, when the granular resin material/vacuum stream mixture reaches the receiver interior, speed of the moving air/vacuum stream drops. The kinetic energy of the stream is no longer sufficient to carry the granular resin, so the resin falls to the bottom of the receiver.

SUMMARY OF THE INVENTION

This invention provides a gravimetric blender of a different design, sometimes referred to herein as a "tower," because the gravimetric blender of this invention has a distinctive central "tower-like" structure supporting a vacuum power unit, which will usually be a vacuum pump. The gravimetric blender accommodates up to four feeders, which may be gravimetric feeders, auger feeders, or some other type of feeder. All of the feeders may run simultaneously, or individually intermittently, with each feeder delivering material at a controlled rate to provide the correct blend to be provided as output by the gravimetric blender.

The hoppers of the gravimetric blender are preferably mounted on load cells so that the rate of loss of weight of material within the hopper can be continuously detected. Using feedback, preferably controlled by a microprocessor, metering rate of material from each hopper can be accurately regulated to provide the correct blend of material output by the gravitation blender.

In the gravimetric blender of the invention, auger feeders are preferably used and are preferably mounted around a common center to meter material to a central point in the support structure for the tower portion of the blender.

The gravimetric blender of the invention incorporates an integrated design in which a receiver mounts directly over each hopper, with the receivers and the hoppers being integrated into the overall design. As a part of the integrated design, there is a single power unit providing a vacuum source for all of the receivers. This results in loading the hoppers using a small, "central" system, in which a single power source serves multiple receivers, which in turn feed associated individual hoppers. Having multiple receivers, hoppers, feeders, and a single vacuum power source, all contained in one integrated unit, provides great operating efficiencies and saves floor space, which is often at a premium in a molding or extruding facility. Similarly, the location of the power unit, and the manner in which the power unit connects to the receivers, saves space and facilitates maintenance and/or replacement of a receiver and/or the power unit (which is preferably a vacuum pump) when required.

Another feature of the invention is that each receiver has only a single tube passing through it. This single tube serves as the vacuum outlet from the receiver at one end of the tube.

At the other end, the tube serves as the resin material/vacuum stream inlet to the receiver.

Another feature of the invention is the connection of the receivers to the vacuum source without tubing. The receiver-vacuum source connection vertically supports the receiver without the receiver needing a supporting base.

In the gravimetric blender according to the invention, a tall, centrally located tubular tower-like structure rises from the main base to above the receivers. The receivers connect by a structure conduit connection to the tower. The power unit, typically a vacuum pump, is preferably on top of the tower. The tower connects the vacuum pump to the receivers. An air cylinder located inside a single tube within each receiver serves to open or close the vacuum port, which is within the and a part of the conduit connection to the central tower-like structure when a hopper associated with the receiver calls for material, with the receiver being actuated and controlled by a microprocessor.

The actuating air cylinder is enclosed within a single tube in each receiver. A steel plug in the center of the tube serves to mount the air cylinder within the tube while also separating the tube ends from one another so that one end of the tube can be devoted to the vacuum connection, which is air/vacuum flow only, while the other end of the tube can serve as the resin material/vacuum stream inlet, into which a mix of high speed vacuum/air and granular resin material flows. The plug desirably has a tapered deflector surface so that granular resin material entering the receiver in the resin material/vacuum stream is deflected downwardly into the receiver interior. The plug is desirably steel with the tapered deflector end surface serving as a wear point, taking the brunt of the resin impact with abrasion resulting, which is a factor in receiver design.

Load cells and an associated microprocessor detect when the amount of granular resin material in one or more of the hoppers is excessively low and direct the power unit, typically and preferably a vacuum pump, to turn on so that a receiver associated with the hopper is actuated. The microprocessor and associated controls further provide for the conveying of granular resin material into each receiver to remain in effect for an appropriate time period for that particular receiver-hopper combination. In one aspect of the invention, the time for conveying and loading each receiver-hopper combination may be set by pressing and holding a button during the individual receiver load cycle, with release of the button setting the load time for that particular receiver within the microprocessor memory.

The tower design locates a filter blow-off device on top of the tower, just under the vacuum pump. The vacuum pump is mounted on the upper surface of a hinged plate; the filter blow-off device is mounted on the underside of the plate. When the hinged plate is tilted about a hinge to open the top of the tower, the filter blow-off device retracts out of the way and the filter, which is located within the tower below the blow-off device, is visible for inspection and replacement, if necessary.

The filter traps any dust in the vacuum air flow. The blow-off device blows the dust off the filter; the dust falls to the bottom of the tower interior. At the tower bottom is a port with a check disk which opens on pressure but closes on vacuum. As dust collects at the bottom of the tower, the weight of the dust opens the check disk and the dust drops into the granular resin material mix below. No collection vessel is required as the dust is consumed by the process machine, together with the granular material provided to the machine.

At least one receiver connects to the vertically oriented conduit and preferably is laterally supported thereby. The receiver is preferably positioned vertically below the vacuum pump for vacuum draw by the vacuum pump through the receiver via the conduit, with the receiver having a vacuum outlet to the conduit as a part of the structure supporting connection to the conduit. The receiver preferably has a granular resin material outlet, preferably at the receiver bottom.

A flap valve at the receiver bottom preferably closes responsively to vacuum drawn within the receiver and preferably opens responsively to weight of resin material thereon in the absence of vacuum draw within the receiver.

A hopper is located preferably below the receiver for receipt of resin material having preferably been temporarily stored in the receiver with the hopper receiving the resin material preferably upon weight of resin material in the hopper reaching a preselected low value. The load cell senses weight of resin material in the hopper. The microprocessor preferably actuates the air cylinder to move the valve plate into position to open the vacuum outlet from the tube to the vertically oriented conduit upon weight of resin material in the hopper reaching a low level, where granular resin material in the hopper must be replenished. Vacuum drawn within the tube pulls the granular resin material vacuum stream into the receiver, delivering granular resin material to the receiver for temporary storage therein and delivery to the associated hopper below. A feeder located below each hopper serves to convey material received from the hopper to a discharge chamber for combination with material from other hoppers prior to delivery to a process machine.

In another one of its aspects, this invention provides a receiver for temporary storage of granular resin material preparatory to delivery to a process machine for molding or extrusion. The receiver preferably includes a receptacle having a resin material/vacuum stream inlet, a vacuum outlet, and a resin material outlet preferably located at the receptacle bottom. The receiver preferably further includes a tube connected to and extending between the resin material/vacuum stream inlet and the vacuum outlet. The tube includes an air cylinder within the tube, a valve in the form of a plate connected to the air cylinder, with the plate being positioned to close the vacuum outlet preferably upon actuation of the air cylinder. The tube further includes a plug for downwardly deflecting resin material carried by the resin material/vacuum drawn stream entering the receptacle via the inlet. The receiver yet further preferably includes a flap valve at the receptacle bottom. The flap valve preferably closes responsively to vacuum drawn within the receptacle, but preferably opens responsively to weight of resin material thereon in the absence of vacuum drawn within the receptacle.

The receiver tube further desirably includes a first aperture in the tube wall, with the aperture being located upstream of the vacuum outlet, for vacuum propagation throughout the receptacle upon the air cylinder being de-energized. The receiver tube further desirably includes a screened second aperture facing downwardly in the tube wall, located upstream of the plug, for downward discharge of granular resin material deflected by the plug upon the resin material/vacuum stream impinging the plug.

In still another one of its aspects, this invention provides apparatus for delivery of granular material carried by a pressurized air or vacuum powered stream, where the apparatus includes an inlet member having a passageway extending therethrough. The apparatus preferably further includes a central body connected to the inlet member, with the central body having a passageway therethrough communicating with the inlet member passageway, and having a lateral opening formed in the central body passageway. The apparatus yet further includes, in this aspect of the invention, an outlet member, connected to the central body, having a passageway extending therethrough, communicating with the central body passageway remotely from the inlet member passageway. In this aspect of the invention, the apparatus yet further includes an actuator housed within the central body passageway and connected to the central body, the actuator having a closure member that moves upon energization of the actuator to close the outlet member. In this aspect of the invention the apparatus still yet further includes a plug connected to the central body and facing the inlet member for deflecting towards the lateral opening the granular material entering the central body as carried by the pressurized air or vacuum stream through the inlet member.

Desirably, the inlet member, the central body and the outlet member are all tubular.

Further desirably, the closure member includes a plate for moving against the outlet member passageway thereby to close the same.

In yet another one of its aspects, this invention provides a method for gravimetrically blending a plurality of granular materials where the method includes providing a vacuum source. The method proceeds with drawing a vacuum stream upwardly through a vertically oriented conduit and optionally positioning a filter in the conduit. The method yet further proceeds by providing a plurality of receivers laterally connected to and supported by the conduit, with interiors of the receivers communicating with the conduit interior via the lateral support connection.

The method still yet further proceeds by drawing separate granular material/vacuum streams into each of the receivers through tubes leading into the receivers, where the granular material/vacuum streams are drawn preferably responsively to vacuum drawn by the single vacuum source through the vertically oriented conduit. The tubes connect with the conduit at juncture of the receivers and the vertically oriented conduit, with the vacuum source drawing vacuum in a receiver via a first aperture in the tube. Each receiver has only a single such tube associated with it.

The method yet further proceeds by positioning a plug within each tube to downwardly deflect the incoming granular material/vacuum stream drawn by the vacuum source.

The method yet further proceeds preferably by halting vacuum draw in a receiver hopper by closing a valve at juncture of the receiver and the conduit, the valve preferably being powered by an air cylinder within the tube, the valve being downstream of the apertures in the tube, relatively closer to the vacuum source.

The method yet further proceeds preferably by maintaining a flap valve closed in the bottom of each receiver by a continuing draw of vacuum in the receiver, thereby preventing downward flow of granular material out of the receiver into a hopper below the receiver.

The method still further proceeds by sensing material weight in the hopper using a load cell and actuating the air cylinder, preferably using a microprocessor receiving the weight signal from the load cell, to halt vacuum draw within the receiver, thereby permitting weight of material in the receiver to open the flap valve for downward flow of material out of the receiver and into the hopper below.

DETAILED DESCRIPTION OF THE INVENTION

Figure 1:
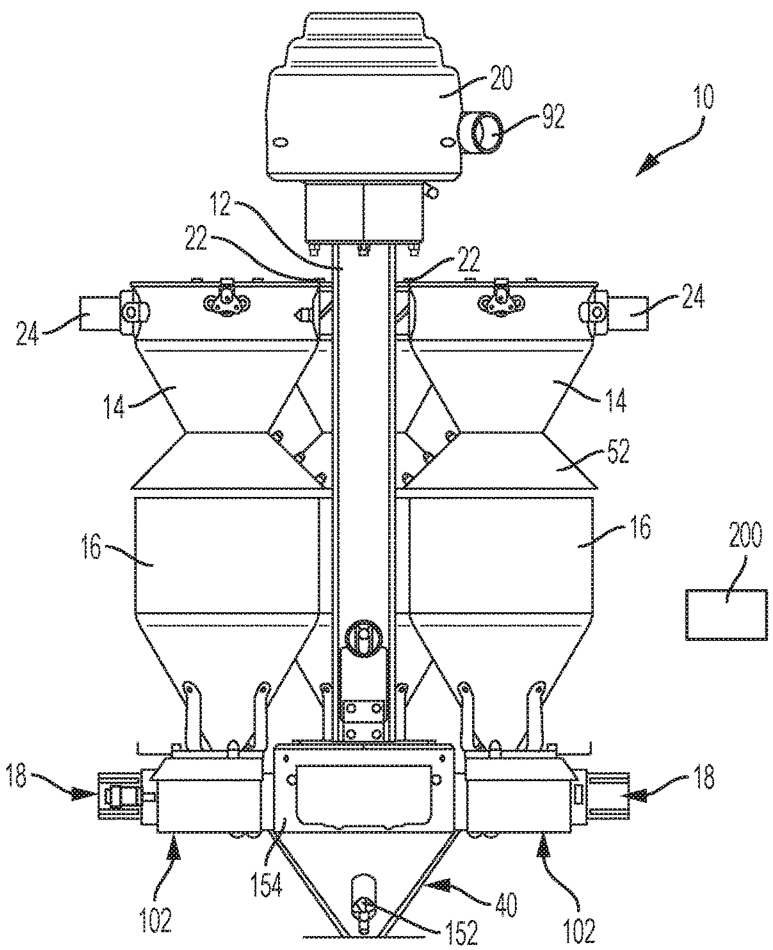
FIG. 1 is a front elevation of a tower configuration gravimetric blender manifesting aspects of the invention.
Figure 2:
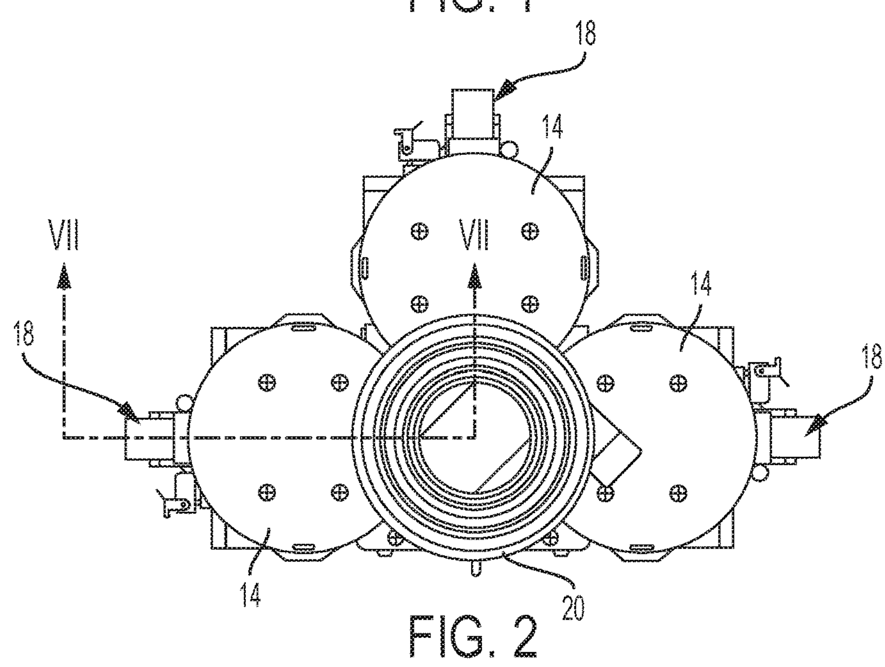
FIG. 2 is a top view of the tower configuration gravimetric blender illustrated in FIG. 1.
Figure 3:
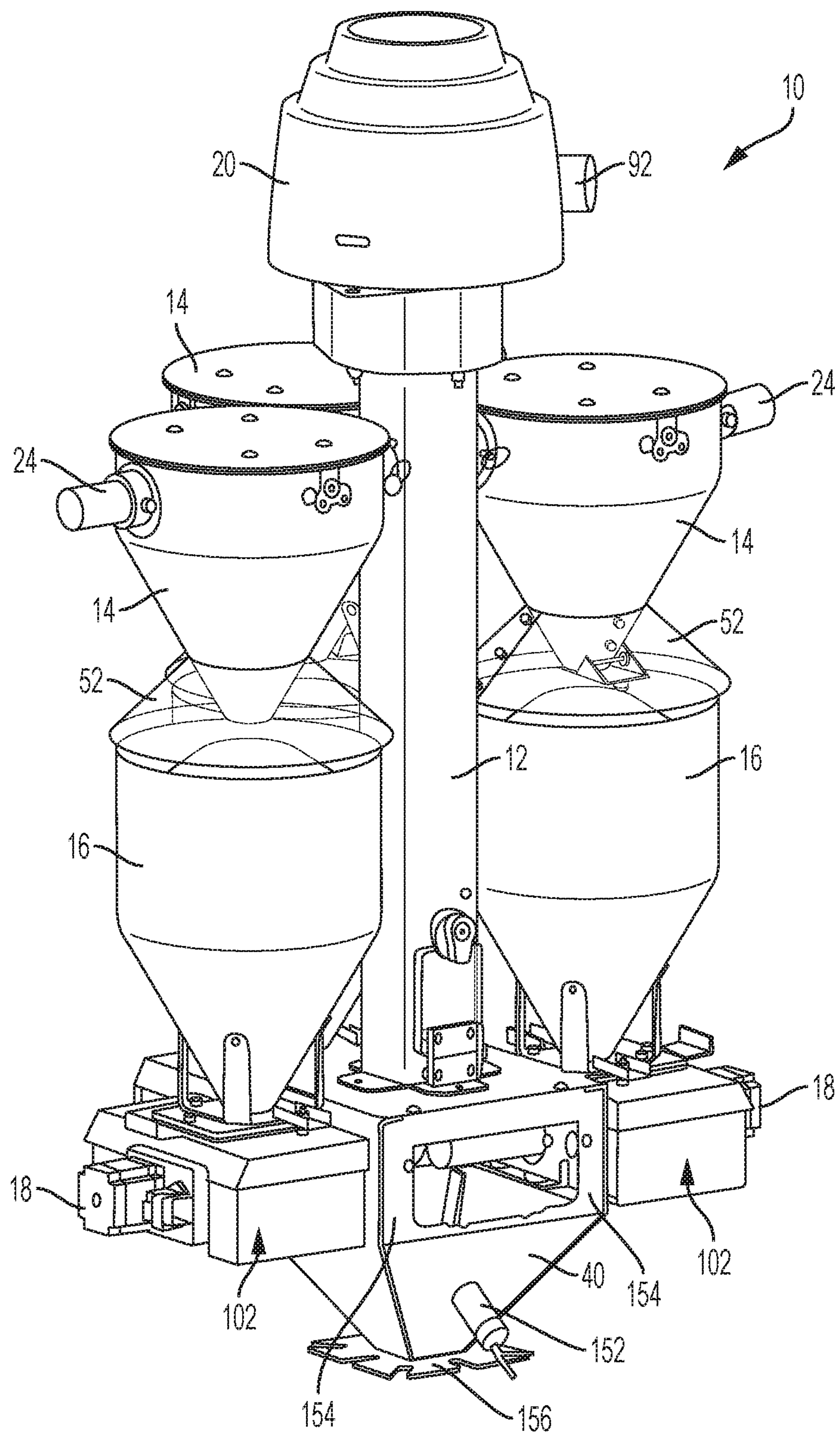
FIG. 3 is a left front quarter isometric view of the tower configuration gravimetric blender illustrated in FIGS. 1 and 2.

Referring to the drawings in general and particularly to FIGS. 1, 2 and 3, a tower configuration gravimetric blender is designated generally 10. Tower configuration gravimetric blender 10 includes a vertically oriented conduit 12 with a plurality of receivers 14, preferably three as shown in FIGS. 1, 2 and 3, connected to and supported by vertically oriented conduit 12. Below each receiver 14 is a hopper 16, positioned to receive granular plastic resin material or other granular material from an associated receiver 14 by downward flow from the associated receiver 14. Positioned below each hopper 16 is a feeder designated generally 18. Feeder 18 laterally conveys granular plastic resin material received vertically from hopper 16 to a tower bin assembly 40 from which the granular resin material is fed, typically by gravity or pneumatically, to a process machine for molding or extrusion. The process machine is not shown in the drawings.

A vacuum source, preferably a vacuum pump, is designated generally 20 and sits atop vertically oriented conduit 12 as illustrated in FIGS. 1 and 3. Vacuum pump 20, during operation of the gravimetric blender, draws vacuum in vertically oriented conduit 12 thereby to draw a resin/vacuum stream from a resin supply, not shown in the drawings, into receivers 14 of tower configuration gravimetric blender 10 and thereby deliver granular resin material to hoppers 16 in the manner described below.

Figure 6:
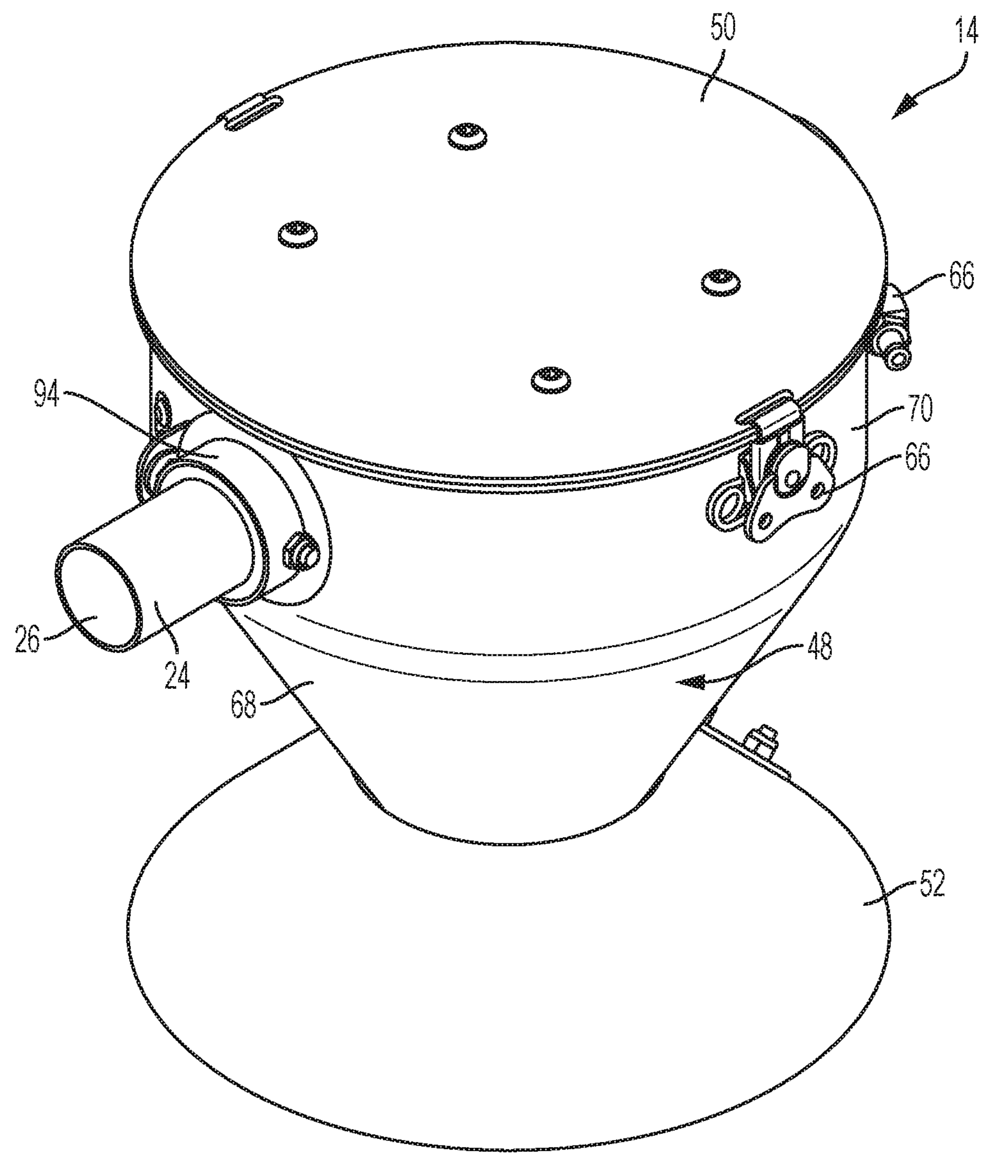
FIG. 6 is an isometric drawing of a receiver portion only of the tower configuration gravimetric blender illustrated in FIGS. 1 through 4.

Receivers 14 are each secured to vertically oriented conduit 12 by receiver support fittings 22 which are preferably generally hollow and cylindrical in shape, as illustrated in FIG. 6. Each receiver 14 includes a single inlet tube portion 24 serving as an inlet to receiver 14 for the resin/vacuum stream. There is one inlet tube portion 24 for each receiver 14.

Referring particularly to FIGS. 6, 7, 8 and 9, each inlet tube portion 24 providing a resin/vacuum stream to a receiver 14 has an inlet end 26 at which the resin/vacuum stream enters the respective inlet tube portion 24 and hence the respective receiver 14. The inflow of the resin/vacuum stream is depicted schematically in FIG. 8. Upon the resin/vacuum stream entering receiver 14 via inlet tube portion 24, the resin/vacuum stream encounters a plug 28 having a deflection surface 54 oriented at approximately 45 degrees with respect to the axis of inlet tube portion 24 and facing inlet end 26 of inlet tube portion 24. Plug 28 is preferably solid and is most preferably steel to be highly wear-resistant with respect to the resin/vacuum stream which impinges plug 28, particularly impinging the angled preferably planar deflection surface 54. As the resin/vacuum stream impinges deflection surface 54, the granules of resin material lose kinetic energy due to collision with deflection surface 54 and fall downwardly, due to their weight, into the lower portion of receiver 14.

Located within and fixed to each tube 25 in a receiver 14 is an air cylinder 30 which is desirably also fixed by a pin or other connection to an associated plug 28. At the bottom of each receiver 14 is a resin material outlet 32 via which resin material collected within receiver 14 may empty out of receiver 14, flowing downwardly into hopper 16 located directly below receiver 14. Such flow of material is depicted schematically in FIG. 8 in the left hand receiver 14. A dump flap 56 is connected to each receiver 14 and is located at the receiver bottom outlet 32, covering and closing resin material outlet 32 when vacuum is drawn within receiver 14. In response to such vacuum draw within receiver 14, dump flap 56 closes resin material outlet 32. The vacuum is sufficient to retain dump flap 56 in place thereby precluding any downward flow of resin material out of receiver 14 so long as vacuum is drawn within receiver 14.

The end of each tube 25 opposite from inlet end 26 defines an air/vacuum passageway or outlet 34 from tube 25 into vertically oriented conduit 12.

Air cylinder 30 includes a shaft 36. When air cylinder 30 is actuated, shaft 36 extends outwardly from cylinder 30 thereby forcing a plate 38, which is fixed to the end of shaft 36, against the outlet end 34 of tube 25, thereby closing tube 25 and halting draw of vacuum within receiver 14.

Connected to each receiver 14 close to the lower portion thereof is a cone, sometimes referred to as a cone cover 52. Cone cover 52 precludes any upward escape of resin material from hopper 16, as resin material flows downwardly into hopper 16 from receiver 14. (If hopper 16 is reasonably full, the granular material tends to bounce upwardly or diagonally upon falling downwardly out of receiver 14 and striking granular material already in hopper 16.) Additionally, cone cover 52 limits spread of dust throughout the processing facility.

Figure 4:
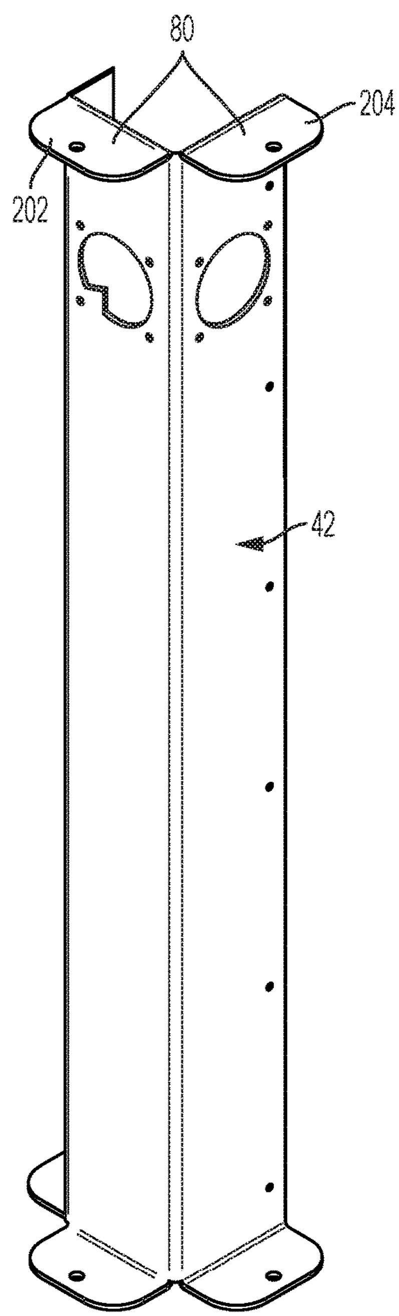
FIG. 4 is an isometric view of one of the tower risers from which a vertically oriented conduit portion of the gravimetric blender illustrated in FIGS. 1, 2 and 3 is constructed.
Figure 5:
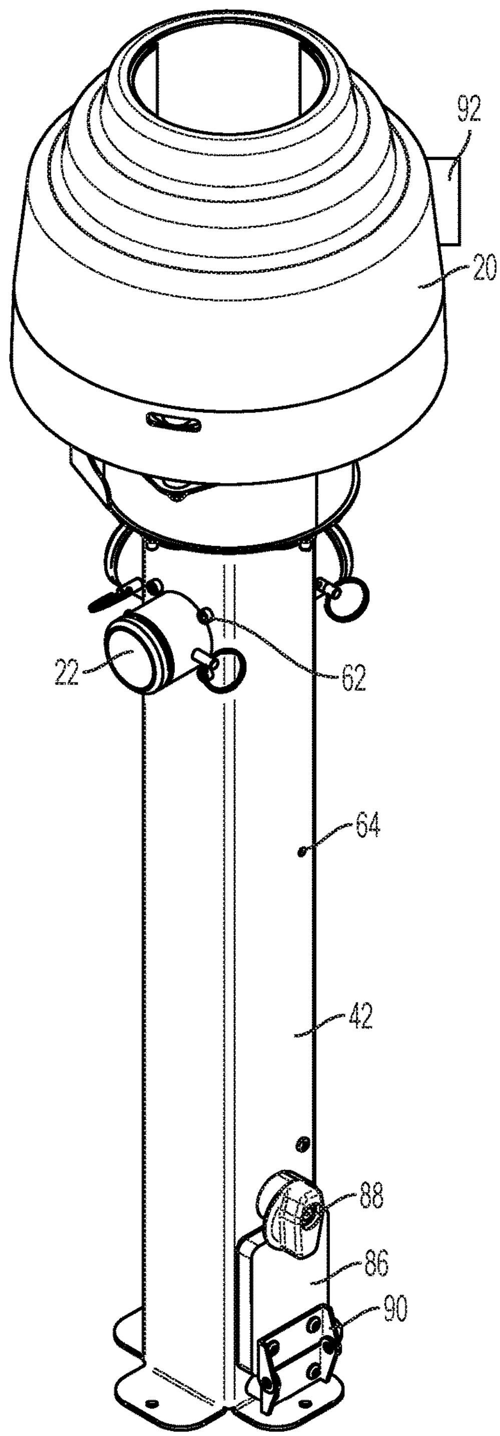
FIG. 5 is a left front quarter isometric view of the vacuum motor and tower portion of the tower configuration gravimetric blender illustrated in FIGS. 1, 2 and 3.

Referring to FIGS. 4 and 5, vertically oriented conduit 12, sometimes referred to herein as the "tower," is preferably fabricated from two risers 42, one of which is illustrated in FIG. 4. Risers 42 are preferably secured together by bolts, one of which is indicated 64 in FIG. 5 showing the "Tower."

As best illustrated in FIGS. 3 and 6, each receiver 14 includes a receptacle portion 48 for receiving and holding the granular resin material conveyed into receiver 14. Each receiver 14 also includes a lid portion 50 covering the upper opening of receptacle 48, as illustrated in FIG. 6. Manually actuable lever-type fittings 66 secure lid 50 to receptacle 48 in an airtight manner to facilitate draw of vacuum within receiver 14. As shown in the drawings, receptacle portion 48 is of generally conical configuration at the lower portion thereof with the conical portion denoted 68. Receiver 14 further has an upper cylindrical portion 70 to which lid 50 fits and is held in place by fittings 66.

Inlet tube portion 24 enters receiver 14 laterally through cylindrical portion 70 of receiver 14 as illustrated in FIG. 6. Suitable airtight cylindrical fittings 94 are secured to cylindrical portion 70 of receiver 14 and are provided where inlet tube portion 24 enters receiver 14 to provide a tight seal, to facilitate the draw of vacuum and thereby entry of the granular resin material/vacuum stream into the interior of receiver 14.

Figure 7:
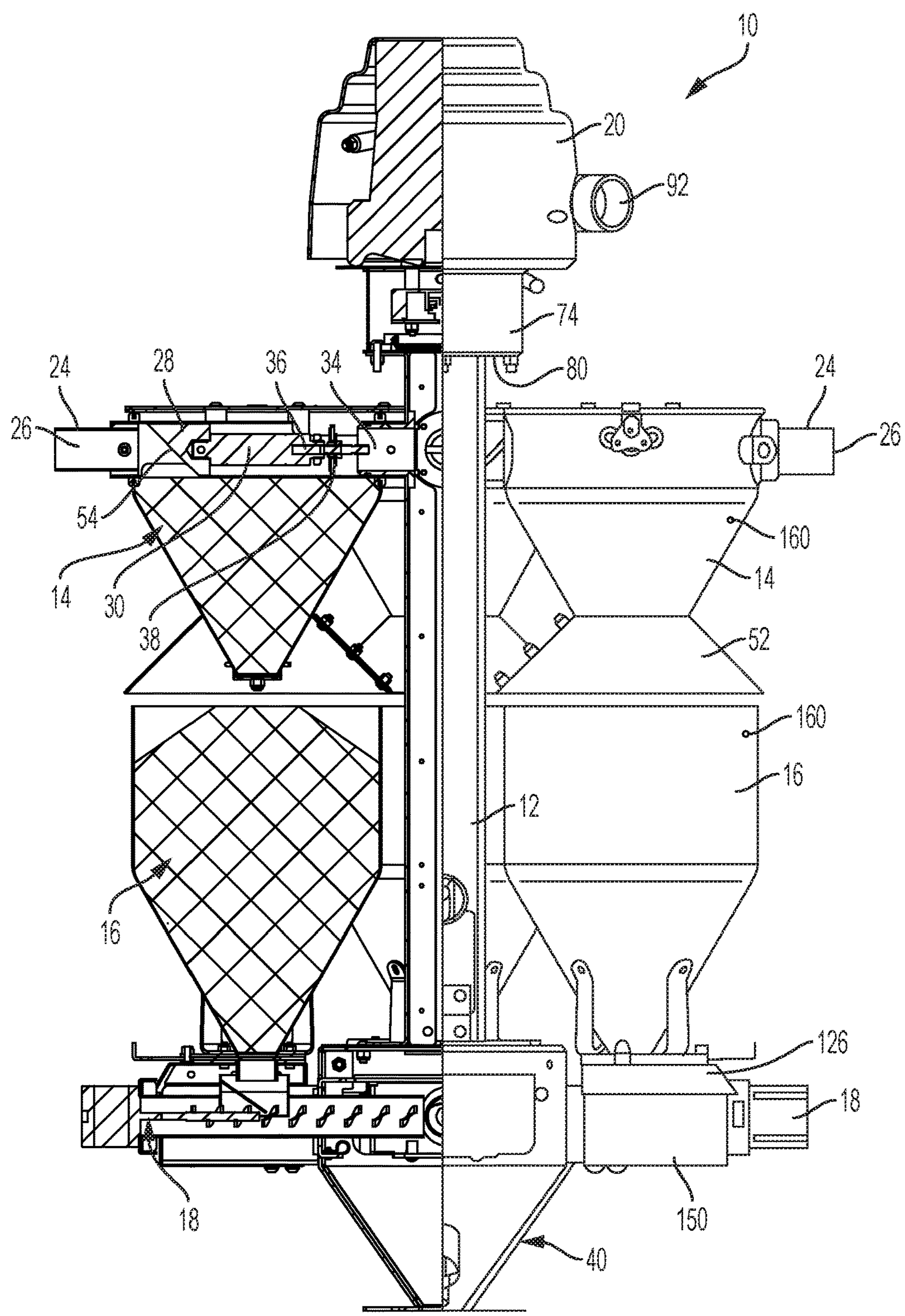
FIG. 7 is a front elevation similar to FIG. 1 but with only the left side of the tower configuration gravimetric blender shown in vertical section, with the section taken at lines and arrows VII-VII in FIG. 2.
Figure 8:
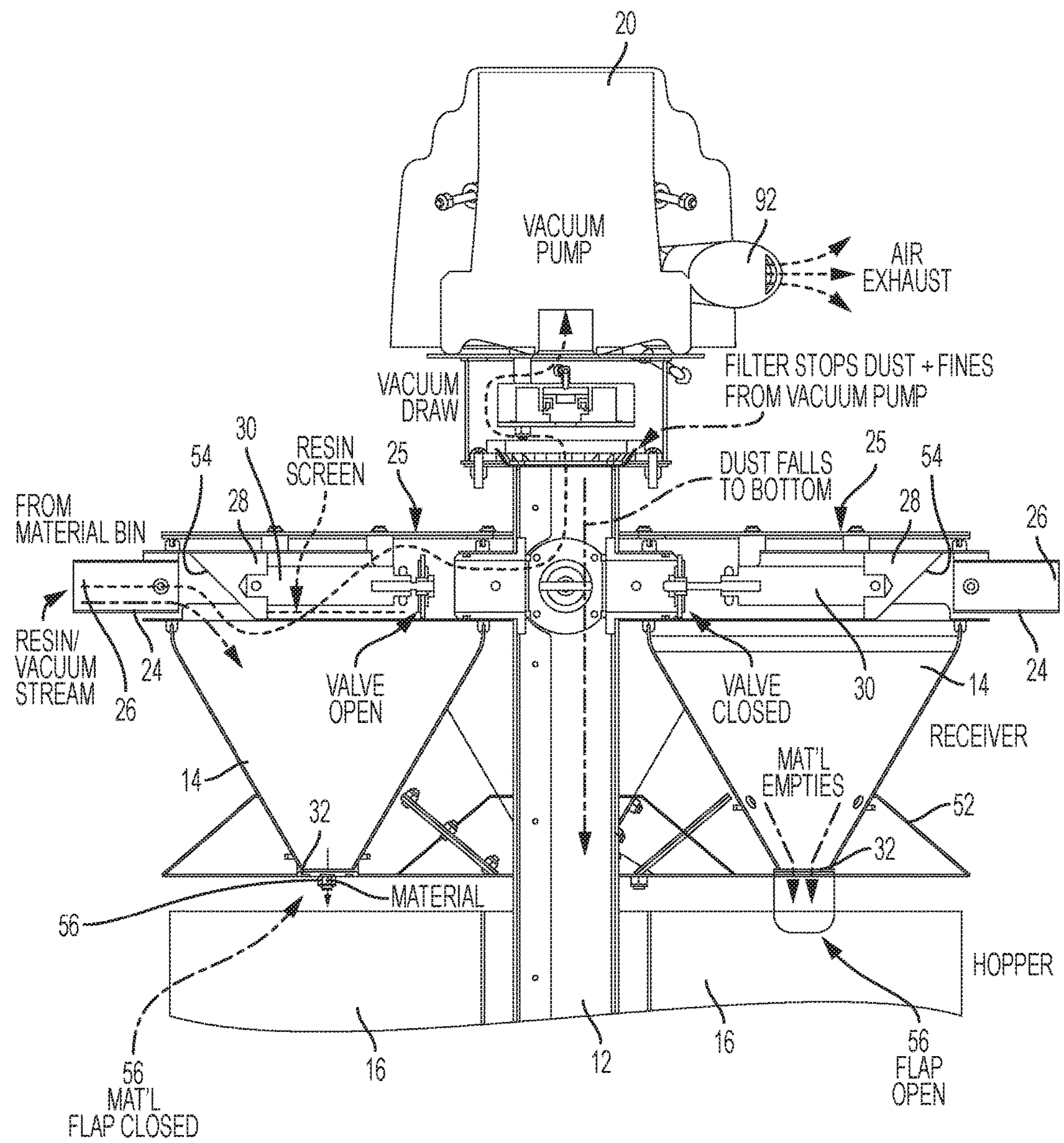
FIG. 8 is a broken away schematic diagrammatic view of the upper portion of the tower configuration gravimetric blender illustrated in FIGS. 1 through 3 and 7 with vacuum stream and resin material flows within the blender being depicted.
Figure 9:
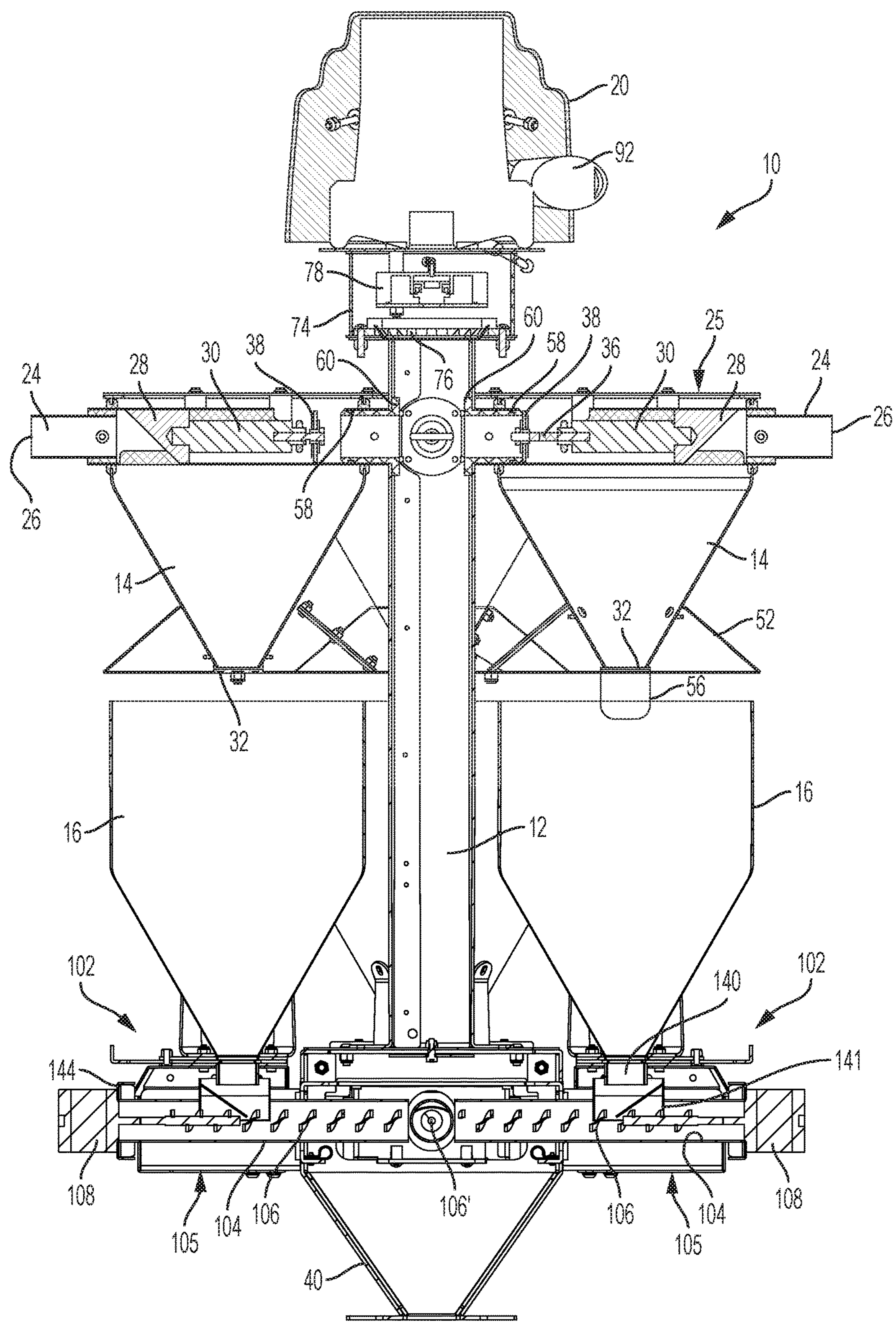
FIG. 9 is a schematic front view, in elevation, of the tower configuration gravimetric blender illustrated in FIGS. 1 through 3, 7 and 8 with portions of the tower configuration gravimetric blender brown away to show internal parts and details.

Secured to the upper end of vertically oriented conduit 12 or "the Tower" is a tower cylindrical fitting designated generally 74 and illustrated in FIGS. 7, 8, 9, 10 and 11. Tower cylindrical fitting 74, sometimes referred to as the tower vacuum base component, is desirably secured to horizontal flanges 80 preferably by screws or nuts and bolts as shown in FIGS. 8 and 9. Each horizontal flange 80 has two parts, designated 202 and 204 in FIG. 4, formed on each of the two risers 42 that are bolted together to form vertically oriented conduit 12, namely "the Tower".

On the top extremity of each of the two tower risers 42 that form vertically oriented conduit 12 are the pair of horizontal flanges 80 that together form a larger horizontal plate 82; the two parts 202, 204 of horizontal flanges 80 are coplanar. The two horizontal flanges 80 contact one another, as risers 42 are bolted or screwed together, to form a horizontal plate 82, which effectively forms a flat, planar mounting surface for a tower cylindrical fitting 74. Nut and bolt combinations that retain tower cylindrical fitting 74 on horizontal plate 82 are shown but not numbered in FIGS. 8 and 9. When the nuts and bolts have secured tower cylindrical fitting 74 to horizontal plate 82, tower cylindrical fitting 74 is essentially immovable respecting vertically oriented conduit 12.

Tower cylindrical fitting 74 has an open bottom into which a dust filter 76 fits as illustrated in FIGS. 8 and 9. Filter 76 catches dust and fines that are within the vacuum stream drawn upwardly within tower 12 by vacuum pump 20 and collects the dust and fines as the vacuum is drawn upwardly through dust filter 76 and around a blowback unit 78, as illustrated in FIG. 9 and into vacuum pump 20. From there, by action of pump 20, the drawn vacuum is exhausted from exhaust port 92 as air.

The vacuum "draw", as that term is used herein, refers to air drawn by vacuum pump 20 under sufficient level of vacuum to carry granular resin material from a storage bin (not shown) through a conduit (not shown) to inlet end 26 of inlet tube portion 24 of tube 25 and into receiver 14. The vacuum draw is sufficient to maintain dump flap 56 closed against the weight of resin material within receiver 14 until such time as air cylinder 30 is actuated to push plate 38 against tubular fitting 58 to close tubular fitting 58, thereby preventing vacuum draw from vertically oriented conduit 12 reaching receiver 14. Once valve plate 38 has closed against tubular fitting 58 to close the opening to tubular fitting 58, vacuum no longer exists within receiver 14 and any resin material therein flows downwardly. The weight of any resin material in receiver 14 overcomes any force applied by dump flap 56, opening dump flap 56 with the resin material flowing downwardly into hopper 16 immediately below receiver 14.

Figure 10:
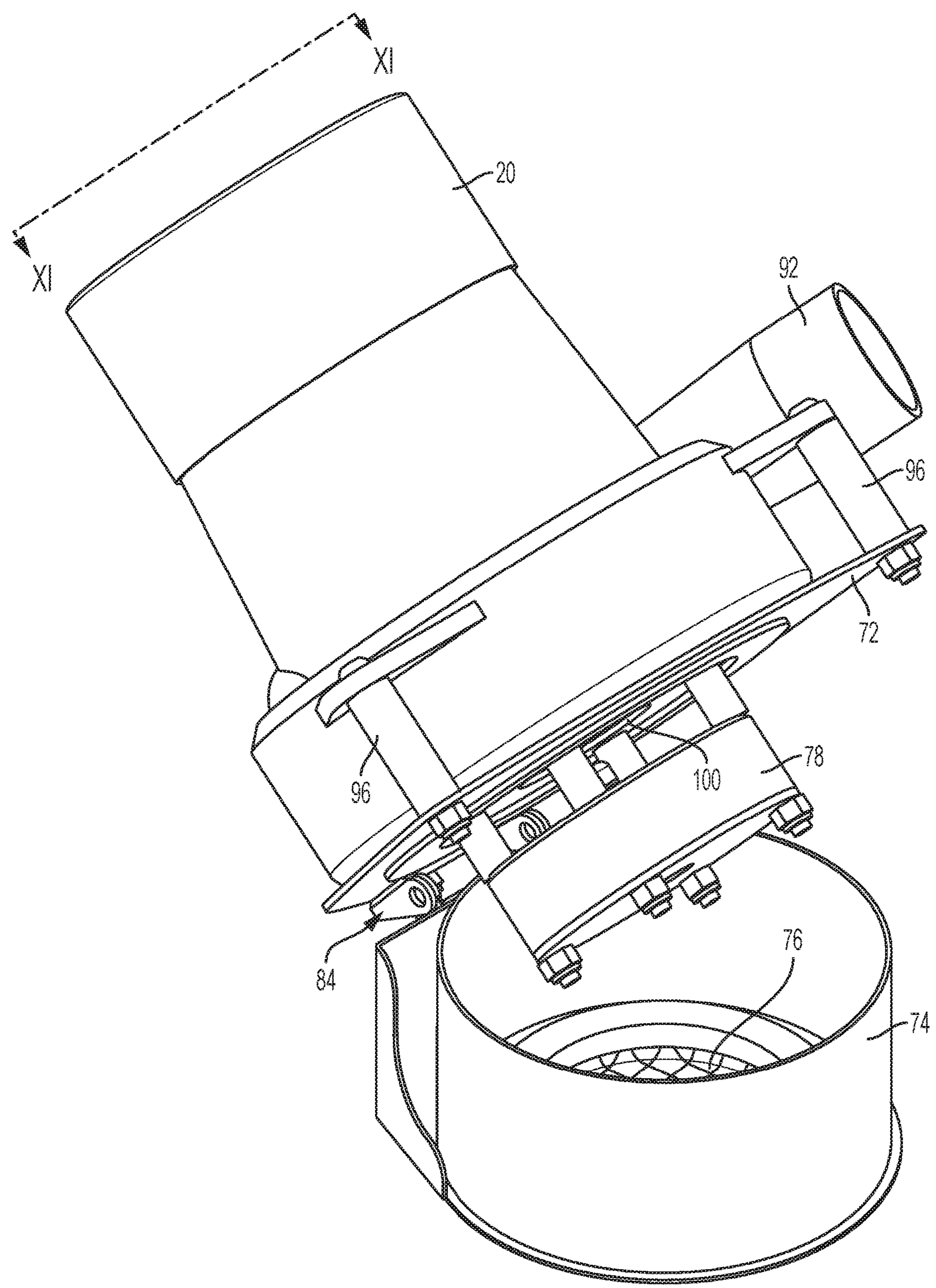
FIG. 10 is an isometric view showing the tilting opening of the top upper section of the tower configuration gravimetric blender according to the invention.
Figure 11:
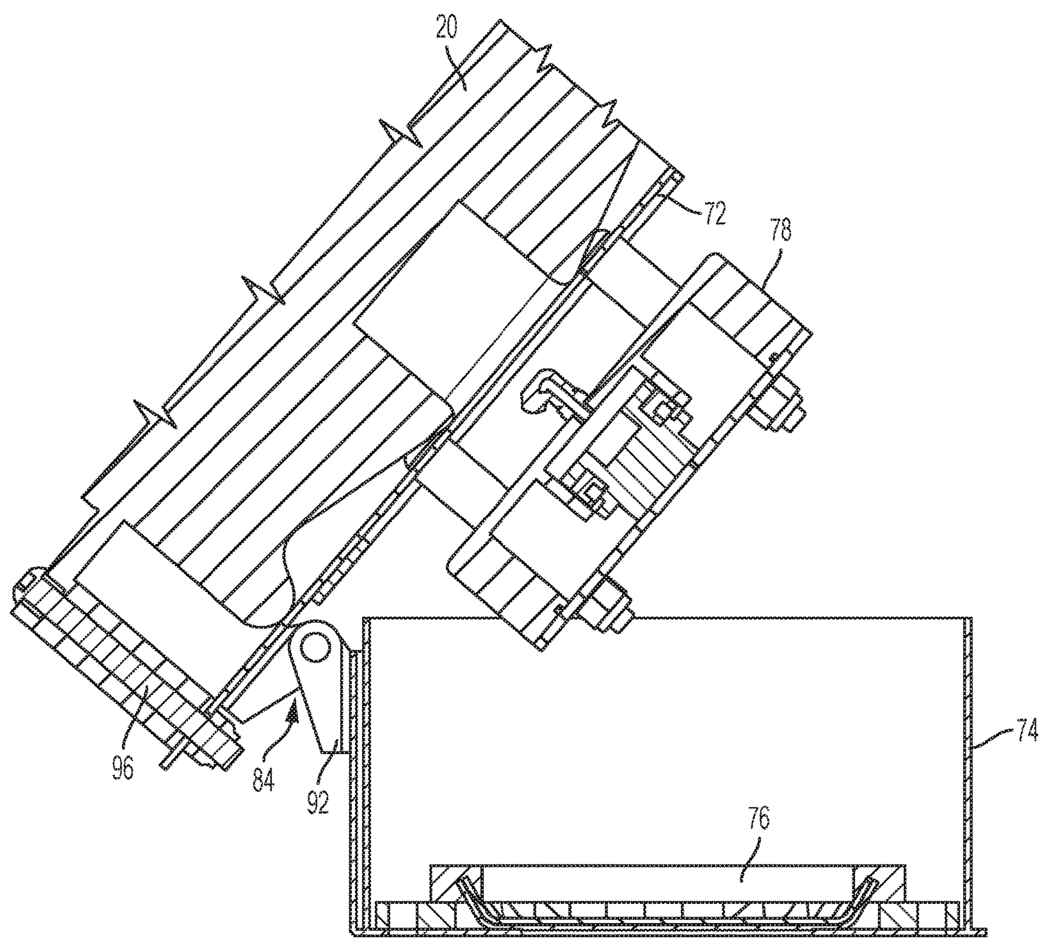
FIG. 11 is a broken side sectional view, taken at lines and arrows XI-XI in FIG. 10, of the top portion of the tower configuration gravimetric blender, showing the tilting opening of the top of the tower section.

A hinge 84 has one portion 92 secured to the side of tower cylindrical fitting 74 as illustrated in FIGS. 10 and 11. Vacuum pump 20 is mounted on a plate 72 and secured thereto via nut and bolt combinations 96 illustrated in FIG. 10. Plate 72 has an aperture 100 at the center thereof which is positioned to align with the suction intake of vacuum pump 20 when vacuum pump 20 is mounted on plate 72.

Also secured to plate 72 on the underside thereof but spaced therefrom is a blowback unit 78 of the type disclosed in the U.S. Pat. Nos. 8,070,844; and 9,387,996. When plate 72 is in the horizontal position, lying across the top of tower cylindrical fitting 74, blow-back unit 78 is spaced close to but away from dust filter 76. Upon actuation of blowback unit 78, when vacuum pump 20 has been shut down, blowback unit 78 emits a powerful downwardly directed blast of air which knocks the collected dust and fines out of filter 76, whereupon the dust and fines fall downwardly through vertically oriented conduit 12, as illustrated in FIG. 8.

Referring primarily to FIGS. 10 and 11, vacuum pump 20 and blow back unit 78 are mutually supported by and connected to mounting plate 72. As illustrated in FIG. 10, vacuum pump 20 is secured to mounting plate 72 by nut-bolt combinations, as is blow back unit 72. When in place on top of tower configuration gravimetric blender 10 with plate 72 in facing contact with annular surface 98 of tower cylindrical fitting 74 and vacuum pump 20 is actuated, vacuum is drawn upwardly through vertically oriented conduit 12 and the air, as vacuum, passes around the lateral surfaces of blow back unit 78, through aperture 100, and into the intake of vacuum pump 20. The intake is aligned with aperture 100 in vacuum pump and blow-back support mounting plate 72 in FIG. 10.

Referring to FIG. 5, a cleanout window having a cover 86 is preferably provided at the bottom of vertically oriented conduit 12. Cover 86 is connected by a cleanout window hinge 90 to the side of one of the two tower risers 42 forming vertically oriented conduit 12. A cleanout window latch 88 retains cleanout window cover 86 in place until there is a need to open the cleanout window to remove dust that has collected at the bottom of vertically oriented conduit 12.

Figure 12:
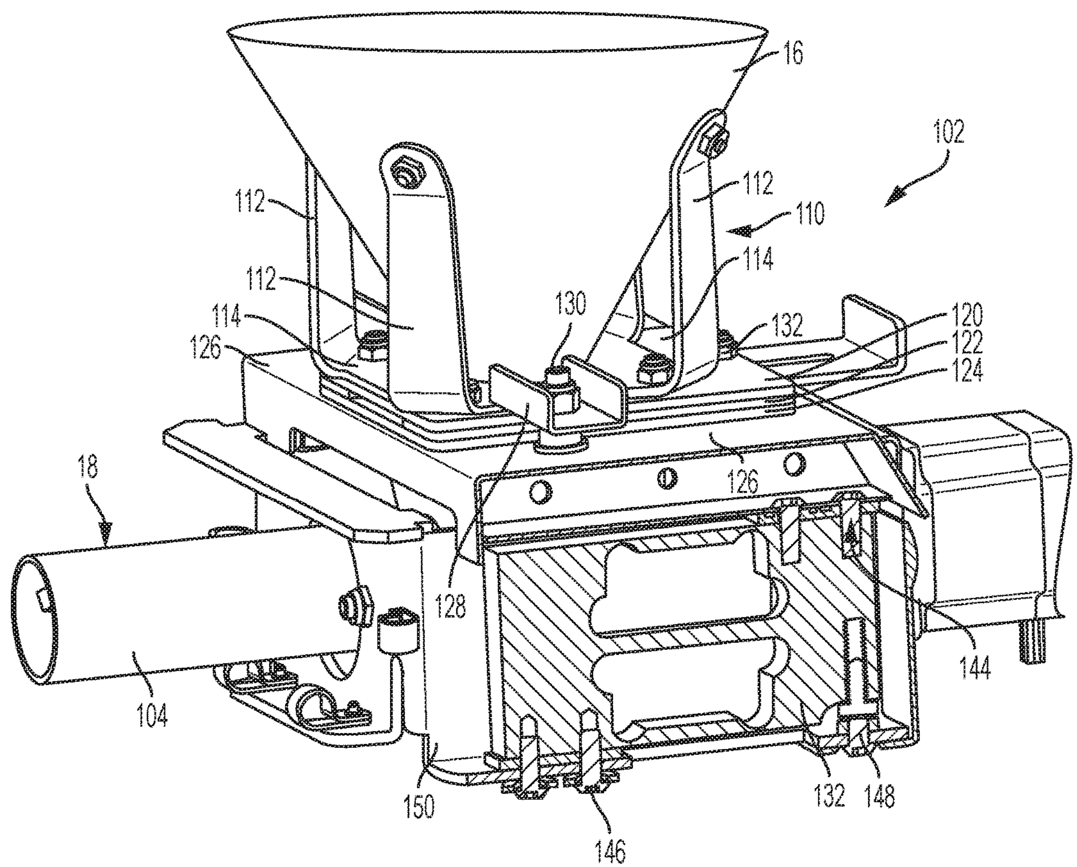
FIG. 12 is a partially broken isometric view taken at lines and arrows XII-XII in FIG. 13, showing a hopper, load cell and load cell supporting structure portion of the tower configuration gravimetric blender illustrated in FIGS. 1 through 3, and 7 through 11.
Figure 13:
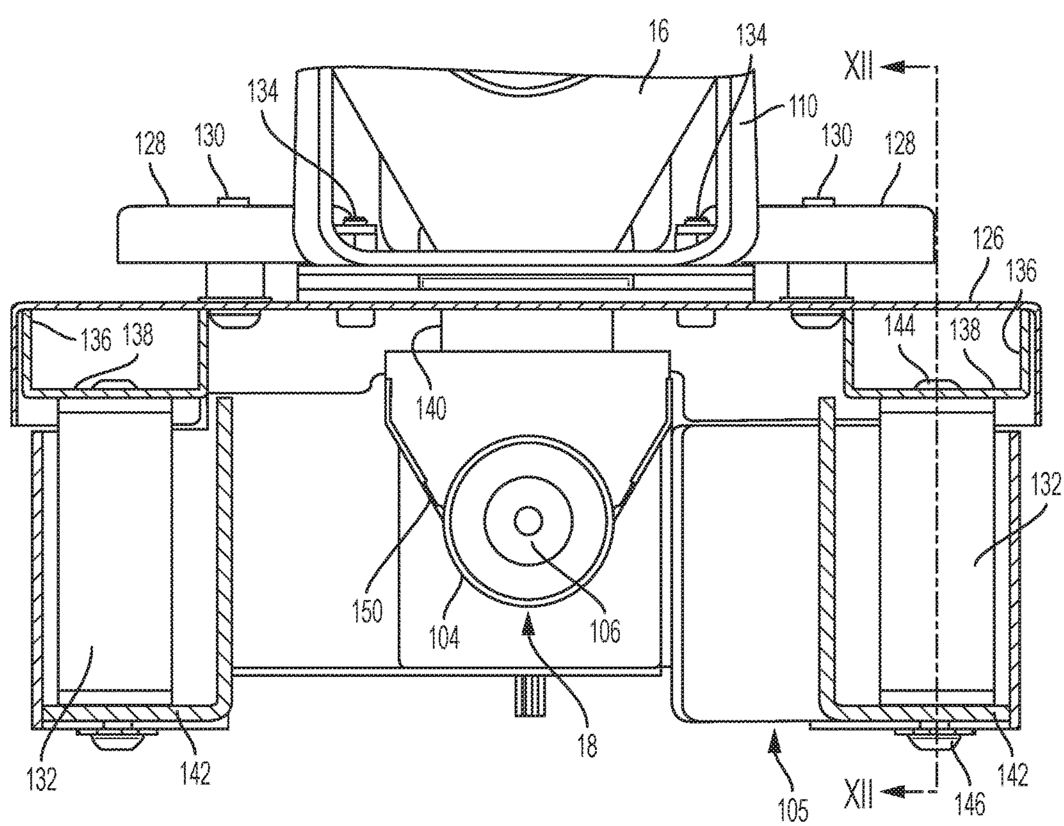
FIG. 13 is a partial sectional view showing details of the hopper support structure, the load cell support structure and one of the material feeders.

Referring to FIGS. 9, 12 and 13, a hopper support assembly 102 is illustrated providing support for one of the hoppers 16; one such support assembly is provided for each hopper 16. Each hopper 16 has a feeder 18 associated therewith, located below the associated hopper 16 as illustrated in FIGS. 1, 3 and 9.

Each hopper support assembly 102 includes a feeder 18 with feeder 18 including a feed tube 104 desirably having an auger feed or screw 106 located therewithin as illustrated in FIG. 9. Each auger or feed screw 106 of a feeder 18 has a motor 108, mounted on the outboard end of associated feeder tube 104 to drive the auger or feed screw 106. Motors 108 are illustrated in FIG. 9 for two of the hopper support assemblies 102 that are visible in that view. In FIG. 9 three augers or feed screws 106 associated with feeder assemblies 105 are illustrated. The auger or feed screw 106 for the third feeder assembly, of which only the end of feed screw 106 can be seen in FIG. 9 due to the orientation of the apparatus and the position at which the sectional view is taken, has an auger or feed screw denoted 106' in FIG. 9.

As shown in FIG. 12, each hopper support assembly 102 includes a number, preferably four, of hopper support brackets 110. Each hopper support bracket 110 has an upstanding portion 112 and a horizontal plate-like portion 114. The plate-like portions 114 of hopper support brackets 110 stop short of the downward projection of the outlet of a hopper 16, thereby providing an aperture for downward flow out of the hopper 16 of granular resin material to a feeder 18 below.

Plate-like portion 114 of bracket 110 rests on a sandwich-like assembly of three spacer plates numbered 120, 122 and 124 respectively, as shown in FIG. 12. An upper one of the spacer plates is designated 120, a central one of the spacer plates is designated 122 and a lower one of the spacer plates is designated 124. As illustrated in FIGS. 12 and 13, the sandwich-like assembly of spacer plates 120, 122, 124 is retained in place on a table-like member 126 by channel members 128 which bear upon the sandwich of spacer plates 120, 122, 124 as a result of force applied by nut-bolt combinations 130 connecting channel member 128 and table-like member 126.

Operation of the gravimetric blender 10 according to the invention is controlled desirably by a microprocessor 200. Most desirably, the microprocessor communicates with air cylinders 30 and vacuum pump 20 of gravimetric blender 10 wirelessly. Internet communication, Ethernet, Blue Tooth protocol communication and the like are all desirable and acceptable. Also, microprocessor 200 may be hard wired to gravimetric blender 10, if needed.

During operation of gravimetric blender 10, when a hopper 16 needs material, this is indicated by the weight of hopper 16 as sensed by a load cell 132. Microprocessor 200, receiving a signal from a load cell 132, converts that signal to a sensed weight and compares that weight to the desired weight of the hopper. If microprocessor 200 decides that additional granular resin material or other resin material is required in a given hopper 16, microprocessor 200 actuates vacuum pump 20, followed by actuation of air cylinder 30 if needed, according to the default position chosen for air cylinder 30 and plate 38. (The default setting or position for air cylinder 30 may be with plate 38 positioned against tubular fitting 58, thereby precluding the draw of vacuum within receiver 14 by vacuum pump 20. Alternatively and preferably, the default, or rest, or unactuated position of air cylinder 30 may be with plate 38 removed from contact with tubular fitting 58, as illustrated on the left side of FIG. 9. With plate 38 removed from tubular fitting 58, vacuum drawn by vacuum pump 20 draws the resin material/vacuum stream into receiver 14 via tube 24.)

When vacuum is drawn and the granular resin/vacuum stream enters receiver 14 via tube 24, the granular resin strikes plug 28, and specifically strikes the deflection surface 54 of plug 28, causing the granular resin material to lose kinetic energy and fall to the bottom of receiver 14 as depicted in FIG. 8. An optional resin screen may be provided, as depicted in FIG. 8, to preclude any granular resin material from being carried by the vacuum stream out of tube 25, through conduit 12 and on to vacuum pump 20, where damage would result. The vacuum, which is actually a stream of very high velocity air, passes around air cylinder 30 and exits receiver tube 25 through tubular fitting 58, whereupon the air/vacuum is drawn upwardly by vacuum pump 20 through the interior of vertically-oriented conduit 12, through dust filter 76, around the periphery of blowback unit 78, and out to the atmosphere via exhaust port 92.

When microprocessor 200 receives a signal from a load cell 132 indicating that a hopper 16 with which a particular load cell 132 is associated has a sufficient material therein, microprocessor 200 acts (to energize or de-energize air cylinder 30, according to which position of plate 38 has been selected as the default position) so that vacuum is no longer drawn through receiver 14 with which the particular hopper 16 and load cell 132 are associated. No more vacuum is drawn until a load cell 132 associated with a hopper 16 signals that the weight of material within that particular hopper 16 has dropped to such a level that additional material is required in hopper 16. Upon receipt of such a signal, microprocessor 200 actuates or de-actuates air cylinder 30 (according to the default position selected for air cylinder 30 and hence plate 38 with respect to tubular fitting 58), in order that vacuum may be drawn and additional material drawn into receiver 14 via resin material/vacuum stream entering receiver 14 via inlet tube portion 24. Microprocessor 200 permits vacuum to continue to be drawn by maintaining plate 38 in a position removed from tubular fitting 58 until such time as the microprocessor 200 receives a signal from the relevant load cell 132, indicating that the weight of material in the relevant hopper 16 has reached a satisfactory level, whereupon air cylinder 30 urges plate 38 against fitting 58, thereby halting draw of vacuum through the relevant receiver.

Referring principally to FIG. 13, table-like member 126 includes a pair of elongated, hollow, rectangular cross-sectional members 136 which extend longitudinally as respecting feeder 18 associated with hopper 16, under which table-like member 126 is positioned. A bottom portion 138 of each rectangular member 136 connects to the upper portion of a respective load cell 126 by screws as illustrated in FIG. 12. Table-like member 126 is preferably constructed of sheet metal with rectangular members 136 formed as a part thereof.

Table-like member 126 includes an aperture therethrough which receives a conduit 140 through which resin from hopper 16 may flow downwardly into an aperture in feed tube 104 of feeder 18. The aperture in feed tube 104 is surrounded by a tubular transition member 141 shown in FIG. 9. Table-like member 126 bears the weight of hopper 16, the hopper support brackets 110, and the sandwich-like assembly of spacer plates 120, 122, 124.

Nut and bolt combinations 130 fitting into channel members 128 secure channel members 128 to table-like member 126. Additionally, nut-bolt combinations 134 secure together the sandwich assembly consisting of upper spacer plate 120, middle spacer plate 122, and lower spacer plate 124; these nut and bolt combinations 134 also secure the spacer plates to table-like member 126, as shown in FIG. 13.

With table-like member 126 bearing the weight of hopper 16, the associated hardware retaining hopper 16 in position, and any resin or other material within hopper 16, accurate weight readings respecting resin material in hopper 16 from an associated load cell 132 are assured. As illustrated in FIGS. 12 and 13, load cell 132 is positioned to be stressed by downward force applied by table-like member 126, with such downward force being applied to the top of load cell 132, as a result of resin material being in hopper 18. The bottom portion of load cell 132 is secured to a horizontal portion of a frame member 142, which is a part of feeder 18.

Load cells 132 are retained in place by upper screws 144 securing the upper portion of load cell 132 to bottom portion 138 of rectangular member 136 which is a portion of table-like member 126 as illustrated in FIGS. 12 and 13. The lower portion of load cell 132 is secured to frame member 142 by lower screws 146 as illustrated in FIG. 12. Upper screws 144 and lower screws 146 are at opposite corners of load cell 132, and are vertically separated as shown, to provide accurate voltage readings from load cell 132. A voltage sensor 148, depicted in FIG. 12, senses the voltage produced by load cell 132 and transmits a signal proportional to that voltage to microprocessor 200 for processing to determine the weight and weight change of any material within hopper 16.

As illustrated in FIGS. 7 and 13, frame member 142 together with table-like member 126 provide an effective housing for feed tube 104 containing feed screw 106 of feeder 18. In FIG. 7, a lateral side portion 150 of frame member 142 is so numbered and provides closure about feed tube 104 containing feed screw 106.

A u-shaped portion of frame member 142 provides a bottom support for feed tube 104 within which feed screw 106 rotates as feed screw 106 advances granular resin material or other material received from hopper 16 towards a tower bin assembly 40 located at the bottom of vertically oriented conduit 12 where feed screws 106 of feeders 18 converge, as illustrated in FIGS. 3, 7 and 9.

In this description of the invention, tube 24 has sometimes been referred to as an "inlet tube" portion of receiver 14 and as having an inlet end 26. In the drawings, inlet tube portion 26 extends only somewhat into receiver 14. While inlet tube segments are shown in the drawings and numbered as 26, it is to be understood that the entire upper portion of the structure defining a part of receiver 14 is tubular in nature; this tubular structure is numbered 25 in the drawings. This "tube" 25, of which inlet tube portion 26 is a part, extends completely through receiver 14 and terminates at juncture with vertically oriented conduit 12. Tubular fitting 58 forms a part of tube 25 and the juncture of tubular fitting 58 with annular flange 60, where annular flange 60 is within vertically oriented conduit 12 as illustrated in FIG. 9, defines the outlet end of tube 25. Accordingly, receiver 14 has but a single tube 25 passing through it with the tube opening or inlet end being defined by inlet end 26 of inlet tube portion 24 and the outlet of tube 25 being defined by the juncture of annular flange 60 of tubular fitting 58 with vertically oriented conduit 12.

While the construction of the juncture of tube 25 with vertically oriented conduit 12 as illustrated in the drawings is the preferred construction, is further within the scope of the invention to provide a plug-in type connection between tube 25 and vertically oriented conduit 12 whereby a receiver 14 requiring a maintenance or replacement may be easily detached from vertically oriented conduit 12. Such plug-in connection can desirably be effectuated by a pair of concentric sleeve like members, one affixed to vertically oriented conduit 12 and the other defining an end of tube 25, with an O-ring or other sealing means between the two concentric tubular members. Other means of attachment, such as threaded fittings, are also within the scope of the invention for connecting receiver 14 to vertically oriented conduit 12 in a matter that receiver 14 is vertically supported by the connection with vertically oriented conduit 12.

While the invention is most desirably implemented using the load cell/vacuum driven approach to opening and closing receivers 14 as disclosed herein, it is within the scope of the invention to position level sensors 160 within both hoppers 16 and receivers 14, as shown schematically, on the right half, unsectioned portion of FIG. 7, and to provide data from those level sensors to microprocessor 200, thereby to control the operating characteristics of the vacuum pump and the operation of air cylinders 30 within tubes 25 in receivers 14.

In such implementation of the invention, wireless communication between such level sensors and the microprocessor is desirable; wired communication is also feasible.

Tower configuration gravimetric blender 10 may be mounted on a flat stand such as stand 156 illustrated in FIG. 3 or may be mounted directly over the feed throat of a molding machine or an extruder so that the granular resin material and other materials supplied by feeders 18 fall directly into the feed throat of the molding machine or extruder.

Granular resin material or other material contained within hoppers 16 is conveyed by feeders 18 to a common point as illustrated in FIG. 9 where the granular resin components and other materials conveyed by feeders 18 fall into a tower bin assembly 40, which has sloped sides as illustrated in FIGS. 1, 3, 7 and 9. A proximity switch 152 or sensor senses the presence or absence of material in bin assembly 40 and actuates an alarm in the event bin assembly 40 is empty. A forward facing vertical surface of bin 40, numbered 154 in the drawings has a window therein, not numbered in the drawings, for observation as the components are fed by feeders 18 into bin 40.

Unlike conventional, known gravimetric blenders, there is no mixing or blending of components performed by the tower configuration gravimetric blender of the invention. No mixing is required since the amount of material delivered by each of the feeders 18 is precise, due to the accurate weight measured by load cells 132 and microprocessor 200. To the extent any mixing might be required, the screw of the process machine effectuates such mixing in an efficient manner.

While the invention has been described herein with three receiver 14/hopper 16/feeder 18 combinations being operatively connected to vertically oriented conduit 12, four or more receiver 14/hopper 16/feeder 18 combinations could be connected to vertically oriented conduit 12. Use of conduit extender structure to connect receiver 14 to vertically oriented conduit 12 is within the scope of the invention, especially if more than four receiver 14/hopper 16/feeder 18 combinations are used.

While the invention and the mode of operation have been described clearly and in more than sufficient detail that one of skill in the art could practice the invention using the teachings of the instant application, and while the claims appended hereto are clear and concise and find full support in the foregoing specification, the invention is not limited to the embodiments described in the foregoing specification or to the literal language of the appended claims. The invention further embraces components, assemblies and methods not disclosed herein but which would perform substantially the same function in substantially the same way to achieve the same result as the apparatus and methods that are the subject of the appended claims.

In the claims appended hereto, the term "comprising" is to be interpreted as meaning "including, but not limited to," while the phrase "consisting of" is to be interpreted as meaning "having only and no more," and the phrase "consisting essentially of" is to be interpreted to mean the recited elements of the claim and those other items that do not materially affect the basic and novel characteristics of the claimed invention.

The following is claimed:

1. A gravimetric blender comprising:

a) a vertically oriented conduit;

b) a vacuum pump, supported by the conduit, and having a suction inlet communicating with the conduit interior;

c) a plurality of receivers, each connected to the conduit, being vertically supported thereby and being angularly spaced thereabout, for vacuum draw though the individual receivers via the conduit by the pump, each receiver having a resin material/vacuum drawn stream inlet and a resin outlet;

d) each receiver having only a single tube therewithin extending from the resin material/vacuum drawn stream inlet to the connection of the receiver with the conduit, each tube comprising:

i) an air cylinder within and connected to the tube, positioned to close the receiver connection to the conduit upon actuation thereof;

ii) a plug within the tube and connected thereto for downwardly deflecting resin material carried by a resin material/vacuum drawn stream entering the receiver via the tube;

iii) a valve at the resin outlet, closing responsively to vacuum drawn within the receiver and opening responsively to the presence of resin material within the receiver in the absence of vacuum draw within the respective receiver; and iv) a plate connected to the air cylinder, for closing the receiver-conduit connection upon air cylinder actuation.

2. The blender of claim 1 further comprising:

a) a plurality of hoppers, each being connected to and below an associated receiver;

b) a plurality of load cells connected to restrictive hoppers, for sensing weight of an associated hopper and any resin material therein;

c) a microprocessor receiving signals to close the vacuum outlets from the respective tubes to the conduit from the respective load cells.

3. A gravimetric blender comprising:

a) a vertical conduit;

b) a vacuum pump having a suction inlet communicating with the interior of the conduit;

c) a plurality of receivers connected to the conduit , each receiver being vertically supported thereby for vacuum draw though the receiver connection and the receiver via the conduit by the pump, each receiver having a resin material/vacuum drawn stream inlet and a resin outlet;

d) each receiver having only a single tube therewithin extending through the receiver from the resin material/vacuum drawn stream inlet to the connection of the receiver with the conduit; the tube further comprising:

i) an air cylinder within the tube;

ii) a plate connected to the air cylinder at a first end thereof and positioned to close the connection to the vertical conduit upon actuation of the air cylinder; and iii) a plug connected to a second end of the air cylinder for opening the inlet upon actuation of the air cylinder and downwardly deflecting any incoming resin material vacuum drawn stream.

4. A gravimetric blender comprising:

a) a vertical conduit;

b) a vacuum pump, supported by the conduit, having a suction inlet communicating with the interior of the conduit;

c) a plurality of receivers connected to the conduit and vertically supported thereby, for vacuum draw though the receiver connection and the receiver via the conduit by the pump, each receiver having a resin material/ vacuum drawn stream inlet and a resin outlet, the receivers being angularly spaced about the conduit;

d) each receiver having a tube therewithin extending from the resin material/vacuum drawn stream inlet to the connection of the receiver with the conduit; the tube further comprising:

i) an air cylinder within the tube; and ii) a plate connected to the air cylinder and positioned to close the connection to the vertical conduit upon actuation of the air cylinder.

5. A gravimetric blender comprising:

a) a vertical conduit;

b) a vacuum pump having a suction inlet communicating with the interior of the conduit;

c) a plurality of receivers connected to the conduit and vertically supported thereby, for vacuum draw though the receiver connection and the receiver via the conduit by the pump, each receiver having a resin material/vacuum drawn stream inlet and a resin outlet;

d) the receivers being at a common position along the axis of the conduit, e) each receiver having only a tube therewithin extending from the resin material/vacuum drawn stream inlet to the connection of the receiver with the conduit; the tube further comprising:

i) an air cylinder within the tube; and ii) a plate connected to the air cylinder for closing the connection to the vertical conduit upon actuation of the air cylinder.

6. The blender of claim 3 wherein the tube further comprises a plug for downwardly deflecting resin material carried by a resin material/vacuum drawn stream entering the receiver via the tube.

7. The blender of claim 6 further comprising a valve at the resin outlet, closing responsively to vacuum drawn within the receiver and opening responsively to weight of resin material thereon in the absence of vacuum draw within the receiver.

8. The blender of claim 3 further comprising:

a) a hopper located below the receiver for receipt of resin material from the receiver upon resin material weight in the hopper reaching a preselected low value; and b) a load cell for sensing weight of resin material in the hopper.

9. The blender of claim 3 further comprising a microprocessor for actuating the air cylinder to move the plate to close the vacuum outlet from the tube to the conduit in response to sensed weight of resin material in the hopper.

10. The blender of claim 9 wherein the microprocessor receives signal from the load cell.

* * * * *